United States Patent
Chou et al.

(10) Patent No.: US 7,543,112 B1
(45) Date of Patent: Jun. 2, 2009

(54) EFFICIENT ON-CHIP INSTRUCTION AND DATA CACHING FOR CHIP MULTIPROCESSORS

(75) Inventors: Yuan C. Chou, Mountain View, CA (US); Santosh G. Abraham, Pleasanton, CA (US); Lawrence A. Spracklen, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 11/472,141

(22) Filed: Jun. 20, 2006

(51) Int. Cl.
*G06F 13/00* (2006.01)
*G06F 13/28* (2006.01)

(52) U.S. Cl. .................................... 711/118
(58) Field of Classification Search .................. 711/118
See application file for complete search history.

(56) References Cited

U.S. PATENT DOCUMENTS

| | | | |
|---|---|---|---|
| 4,445,174 A * | 4/1984 | Fletcher | 711/121 |
| 5,317,716 A | 5/1994 | Liu | 711/144 |
| 5,694,573 A * | 12/1997 | Cheong et al. | 711/122 |
| 6,393,525 B1 | 5/2002 | Wilkerson et al. | 711/136 |
| 6,681,293 B1 | 1/2004 | Solomon et al. | 711/122 |
| 2004/0039880 A1* | 2/2004 | Pentkovski et al. | 711/146 |
| 2007/0186050 A1 | 8/2007 | Luick | 711/137 |

OTHER PUBLICATIONS

U.S. Appl. No. 11/654,150, filed Jan. 16, 2007, Spracklen et al., entitled "Efficient Caching of Stores in Scalable Chip Multi-Threaded Systems".

* cited by examiner

*Primary Examiner*—Sheng-Jen Tsai
*Assistant Examiner*—Edward J Dudek
(74) *Attorney, Agent, or Firm*—Gunnison, McKay & Hodgson, L.L.P.; Philip J. McKay

(57) ABSTRACT

The storage of data line in one or more L1 caches and/or a shared L2 cache of a chip multiprocessor is dynamically optimized based on the sharing of the data line. In one embodiment, an enhanced L2 cache directory entry associated with the data line is generated in an L2 cache directory of the shared L2 cache. The enhanced L2 cache directory entry includes a cache mask indicating a storage state of the data line in the one or more L1 caches and the shared L2 cache. In some embodiments, where the data line is stored in the shared L2 cache only, a portion of the cache mask indicates a storage history of the data line in the one or more L2 caches.

7 Claims, 12 Drawing Sheets

FIG. 10A

| L2$ only 1 | L2$ 1 | L1$[0] 1 | L1$[1] 1 |
|---|---|---|---|
| 1002A | 1004A | 1006A | 1008A |

FIG. 10B

| L2$ only 0 | L2$ 1 | L1$[0] 1 | L1$[1] 0 |
|---|---|---|---|
| 1002B | 1004B | 1006B | 1008B |

FIG. 11A

| L2$ only 1 | L2$ 1 | L1$[0] 1 | L1$[1] 0 |
|---|---|---|---|
| 1102A | 1104A | 1106A | 1108A |

FIG. 11B

| L2$ only 0 | L2$ 0 | L1$[0] 1 | L1$[1] 0 |
|---|---|---|---|
| 1102B | 1104B | 1106B | 1108B |

FIG. 12A

| L2$ only 0 | L2$ 0 | L1$[0] 1 | L1$[1] 1 |
|---|---|---|---|
| 1202A | 1204A | 1206A | 1208A |

FIG. 12B

| L2$ only 0 | L2$ 1 | L1$[0] 1 | L1$[1] 0 |
|---|---|---|---|
| 1202B | 1204B | 1206B | 1208B |

FIG. 13A

| L2$ only 0 | L2 $ 0 | L1$[0] 0 | L1$[1] 1 |
|---|---|---|---|
| 1302A | 1304A | 1306A | 1308A |

FIG. 13B

| L2$ only 0 | L2$ 1 | L1$[0] 1 | L1$[1] 0 |
|---|---|---|---|
| 1302B | 1304B | 1306B | 1308B |

FIG. 14A

| L2$ only 0 | L2$ 0 | L1$[0] 0 | L1$[1] 0 |
|---|---|---|---|
| 1402A | 1404A | 1406A | 1408A |

FIG. 14B

| L2$ only 1 | L2$ 1 | L1$[0] 0 | L1$[1] 0 |
|---|---|---|---|
| 1402B | 1404B | 1406B | 1408B |

FIG. 15A

| L2$ only 1 | L2$ 1 | L1$[0] 0 | L1$[1] 0 |
|---|---|---|---|
| 1502A | 1504A | 1506A | 1508A |

FIG. 15B

| L2$ only 0 | L2$ 1 | L1$[0] 1 | L1$[1] 0 |
|---|---|---|---|
| 1502B | 1504B | 1506B | 1508B |

FIG. 16A

| L2$ only 0 | L2$ 1 | L1$[0] 0 | L1$[1] 1 |
|---|---|---|---|
| 1602A | 1604A | 1606A | 1608A |

FIG. 16B

| L2$ only 1 | L2$ 1 | L1$[0] 0 | L1$[1] 0 |
|---|---|---|---|
| 1602B | 1604B | 1606B | 1608B |

FIG. 17A

| L2$ only 0 | L2$ 1 | L1$[0] 1 | L1$[1] 1 |
|---|---|---|---|
| 1702A | 1704A | 1706A | 1708A |

FIG. 17B

| L2$ only 0 | L2$ 1 | L1$[0] 1 | L1$[1] 0 |
|---|---|---|---|
| 1702B | 1704B | 1706B | 1708B |

EFFICIENT ON-CHIP INSTRUCTION AND DATA CACHING FOR CHIP MULTIPROCESSORS

BACKGROUND OF THE INVENTION

1. Field of the Invention

The present invention relates generally to enhancing performance of computer processors, and more particularly to methods for reducing the redundant storage of data in caches of chip multiprocessors (CMPs).

2. Description of Related Art

A conventional chip multiprocessor (CMP) is a computer processor composed of two or more single-threaded or multi-threaded processor cores on a single chip. Typically each processor core of the CMP includes at least one first level cache, herein referred to as an L1 cache, and/or a core cache. An L1 cache can be further subdivided into L1 sub-caches, such as an instruction (I) cache and a data (D) cache.

The processor cores typically share a single second level cache, herein referred to as a shared L2 cache, also on the chip. The shared L2 cache allows for data communication and data sharing between threads running on different processor cores. Some shared L2 caches are further subdivided into L2 sub-caches, sometimes referred to as banks. Typically, communication occurs between the L1 caches of the processor cores and the shared L2 cache via a crossbar.

Where a shared L2 cache is banked, the crossbar determines the bank to be accessed in the shared L2 cache.

A cache, such as an L1 cache and a shared L2 cache, is a memory structure that stores data for use by the CMP. As used herein the term data refers to program data, and to program instructions. Typically a cache is smaller in storage capacity than a main memory of a computer system, and stores copies of data and instructions from main memory that are more frequently used by a CMP. As a cache is usually closer to the processor core than a main memory of a computer system, the data in the cache is typically accessed more quickly than an access of the same data from main memory. For example, in a conventional CMP, the L1 caches and the shared L2 cache are typically on the same chip allowing for faster data access than an access of the same data from main memory.

Data stored in a cache is typically stored in a data store area of the cache, and the stored data is commonly referred to as a data line. The cache further includes a cache directory that includes one or more cache directory entries that individually reference a different data line stored in the cache.

In conventional CMPs, each data line stored in an L1 cache has an associated L1 cache directory entry in the L1 cache directory that identifies the data line and where the data line is stored in the L1 data store of the L1 cache. Similarly, each data line stored in a shared L2 cache has an associated L2 cache directory entry in the shared L2 cache directory that identifies the data line and where the data line is stored in the shared L2 cache. Thus, in a conventional shared L2 cache of a conventional CMP, there is an associative one to one mapping of each L2 cache directory entry to a different associated data line stored in the L2 cache.

An L2 cache directory entry in a shared L2 cache of a conventional CMP typically includes a memory coherence protocol (MCP) value followed by a tag value identifying a particular data line. The MCP value, for example, one or more bits, indicates one or more memory states of the associated data line in accordance with a particular cache memory coherence protocol. Examples of memory coherence protocols include MOESI, MSI, MESI, and MOSI protocols. Memory coherence protocols are well known to those of skill in the art.

The tag value, for example, forty (40) bits, identifies a data line and the location of the data line in the shared L2 cache data store.

When a process is executed by a conventional CMP, at least one of the processor cores of the CMP typically requests a read access or a write access to data. When a read access request is issued, typically the requesting processor core requests a data line from the processor core's L1 cache. If the data line is present in the L1 cache, commonly called an L1 cache hit, the data line is returned to the requesting processor core. Otherwise, if the data line is not present in the L1 cache, commonly called an L1 cache miss, the L1 cache requests the data line from the shared L2 cache.

If the data line is present in the L2 cache, commonly called an L2 cache hit, the data line is returned to the requesting L1 cache. Otherwise, if the data line is not present in the shared L2 cache, commonly called an L2 cache miss, the shared L2 cache requests the data line from an off chip source, such as from a lower level cache, e.g., an L3 cache, if present, or from the main memory of the computer system. When the data line is obtained, the data line is returned to the shared L2 cache, and then to the requesting L1 cache.

Currently when a data line is obtained for a processor core in response to a read access request, the data line is stored in the L1 cache of the requesting processor core, and the data line is also stored in the shared L2 cache regardless of whether that data line is used only by the requesting processor core or by other processor cores.

Thus, in conventional CMP designs, each processor core can retain private data in the shared L2 cache in addition to retaining the private data in the processor core's own L1 cache. Herein a data line that is used by one or more threads on a particular processor core, but not used by any of the threads on any of the other processor cores, is termed private data, or data private to that particular processor core. A data line that is used by one or more threads on more than one processor core is termed shared data.

Consequently, competition for storage space in the shared L2 cache increases as private data of one processor core competes with private data of another processor core for the limited space in the shared L2 cache. This competition for storage space in the shared L2 cache can lead to an increase in the L2 cache miss rate if there is not enough storage space for a requested data line in the shared L2 cache.

Further, a processor core that issues many unused prefetches of data can pollute the shared L2 cache with storage of unused data and displace the storage of more useful data for other processor cores from the shared L2 cache, again leading to an increase in the L2 cache miss rate. An increase in the L2 cache miss rate in turn leads to an increase in off-chip bandwidth usage to retrieve the requested data, such as from an L3 cache or from main memory, which can lead to an increase in the L2 cache miss latency. Increases in the L2 cache miss rate and in the L2 cache latency are usually highly detrimental to a CMP's performance.

SUMMARY OF THE INVENTION

In accordance with one embodiment, an enhanced chip multiprocessor includes: a plurality of processor cores, wherein each of the plurality of processor cores further includes at least one first level (L1) cache; a shared second level (L2) cache communicatively coupled with each of the plurality of processor cores, wherein the shared second level (L2) cache further includes at least one enhanced second level (L2) cache directory entry associated with a data line stored in the chip multiprocessor, the enhanced second level (L2)

cache directory entry indicating a storage state of the at least one data line in the shared second level (L2) cache and in each of the at least one first level (L1) caches of each of said plurality of processor cores in the chip multiprocessor.

In accordance with another embodiment of the invention, a computer implemented method of storing a data line in a cache of a chip multiprocessor, wherein the chip multiprocessor includes a shared second level (L2) cache and a plurality of processor cores each communicatively coupled with the shared second level (L2) cache, each of the plurality of processor cores including at least one first level (L1) cache, includes: receiving an access request from a requesting processor core of the chip multiprocessor, the access request identifying a data line; storing the data line in at least one of the shared second level (L2) cache and a first level (L1) cache based on the sharing of the data line in the chip multiprocessor; and generating an enhanced second level (L2) cache directory entry in a shared second level (L2) cache directory of the shared second level (L2) cache, the enhanced second level (L2) cache directory entry indicating a storage state of the data line in the chip multiprocessor.

Embodiments in accordance with the present invention dynamically store data in the L1 caches and/or the shared L2 cache of a CMP based on the sharing of the data. In one embodiment, data that is private data to a requesting processor core is placed in that requesting processor core, and data that is requested by more than one processor core is replicated in the shared L2 cache. This is in contrast to current CMP design in which data is replicated in both an L1 cache and the shared L2 cache regardless of whether the data is requested by more than one processor core.

Further, embodiments in accordance with the present invention permit the data storage in the L1 caches and the shared L2 cache to dynamically change over time to more optimally meet the needs of an application executing on the CMP. Also, embodiments in accordance with the invention minimize the competition among processor cores for storage of private data in the shared L2 cache while retaining the ability for processor cores to communicate and share data efficiently via the shared L2 cache. Additionally, embodiments in accordance with the present invention reduce the pollution of the shared L2 cache with data from useless prefetches issued by a processor core.

BRIEF DESCRIPTION OF THE DRAWINGS

The accompanying drawings, which are incorporated in, and constitute a part of this specification, illustrate embodiments of the invention and together with the description, serve to explain the principles of the invention. In the drawings the term "cache" is represented with a dollar sign "$", and the term "directory" is abbreviated as "DIR". In the drawings:

FIG. 10A illustrates another example of an initial state of a cache mask in an enhanced L2 cache directory entry in accordance with one embodiment of the invention.

FIG. 10B illustrates one example of a subsequent state of the cache mask of FIG. 10A in accordance with one embodiment of the invention.

FIG. 11A illustrates another example of an initial state of a cache mask in an enhanced L2 cache directory entry in accordance with one embodiment of the invention.

FIG. 11B illustrates one example of a subsequent state of the cache mask of FIG. 11A in accordance with one embodiment of the invention.

FIG. 12A illustrates another example of an initial state of a cache mask in an enhanced L2 cache directory entry in accordance with one embodiment of the invention.

FIG. 12B illustrates one example of a subsequent state of the cache mask of FIG. 12A in accordance with one embodiment of the invention.

FIG. 13A illustrates another example of an initial state of a cache mask in an enhanced L2 cache directory entry in accordance with one embodiment of the invention.

FIG. 13B illustrates one example of a subsequent state of the cache mask of FIG. 13A in accordance with one embodiment of the invention.

FIG. 14A illustrates another example of an initial state of a cache mask in an enhanced L2 cache directory entry in accordance with one embodiment of the invention.

FIG. 14B illustrates one example of a subsequent state of the cache mask of FIG. 14A in accordance with one embodiment of the invention.

FIG. 15A illustrates another example of an initial state of a cache mask in an enhanced L2 cache directory entry in accordance with one embodiment of the invention.

FIG. 15B illustrates one example of a subsequent state of the cache mask of FIG. 15A in accordance with one embodiment of the invention.

FIG. 16A illustrates another example of an initial state of a cache mask in an enhanced L2 cache directory entry in accordance with one embodiment of the invention.

FIG. 16B illustrates one example of a subsequent state of the cache mask of FIG. 16A in accordance with one embodiment of the invention.

FIG. 17A illustrates another example of an initial state of a cache mask in an enhanced L2 cache directory entry in accordance with one embodiment of the invention.

FIG. 17B illustrates one example of a subsequent state of the cache mask of FIG. 17A in accordance with one embodiment of the invention.

DETAILED DESCRIPTION

Herein the term data refers to both program data as well as program instructions. Further herein data is also referred to as a data line. Further herein the term L1 cache refers collectively to any sub-caches of an L1 cache, such as an I cache and a D cache of an L1 cache. Further herein the term shared L2 cache refers collectively to any sub-caches of a shared L2 cache.

Figure 1:
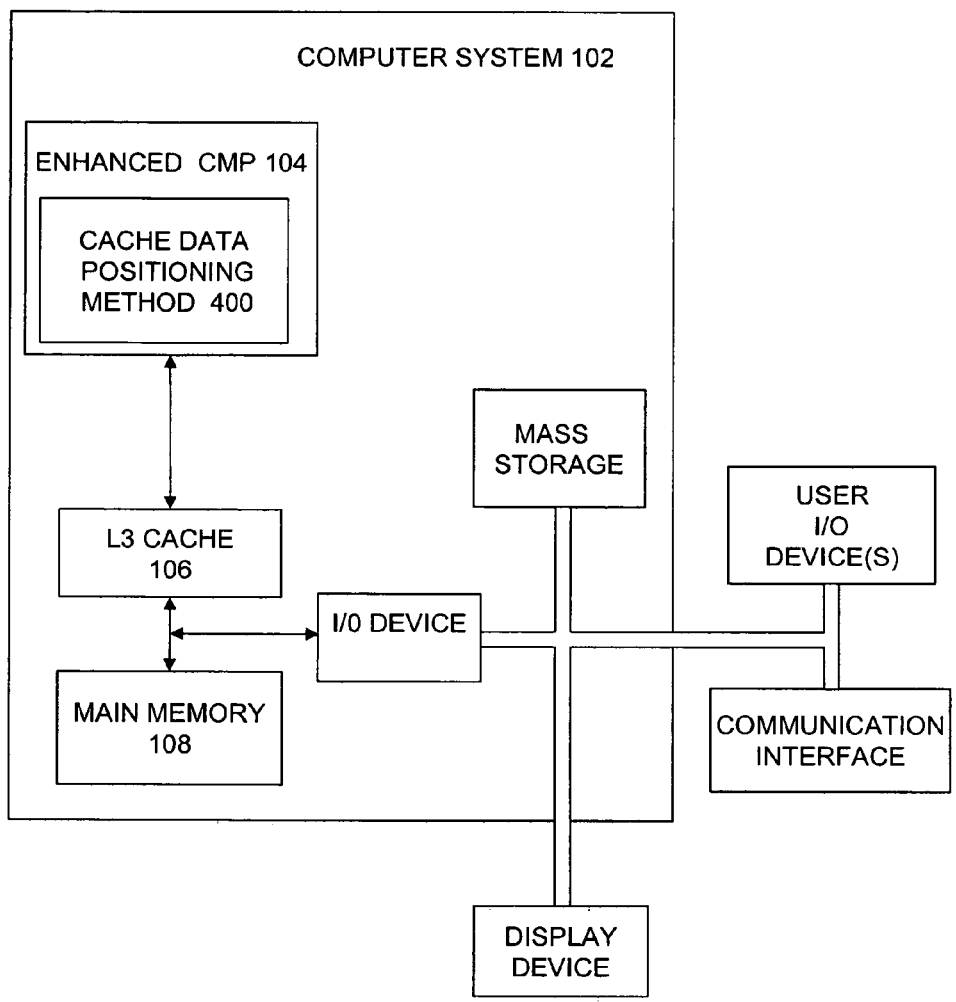
FIG. 1 illustrates a block diagram of a computer system including an enhanced chip multiprocessor (CMP) in which the cache storage of data in the CMP is dynamically determined based on the sharing of the data in accordance with one embodiment of the invention.

FIG. 1 illustrates a block diagram of a computer system 102 including an enhanced chip multiprocessor (CMP) 104 in which the cache storage of data is dynamically determined based on the sharing of the data in accordance with one embodiment of the invention. Referring now to FIG. 1, computer system 102 includes enhanced CMP 104 that executes program code, such as application code (not shown). In one embodiment, enhanced CMP 104 requests data as needed from L3 cache 106 and/or from main memory 108, and stores the requested data in one or more on chip caches based on the sharing of the data.

In one embodiment, enhanced CMP 104 dynamically stores data in one or more on-chip caches in accordance with a cache data positioning method 400 further described herein. One example of an embodiment of enhanced CMP 104 is further described with reference to FIG. 2.

Figure 2:
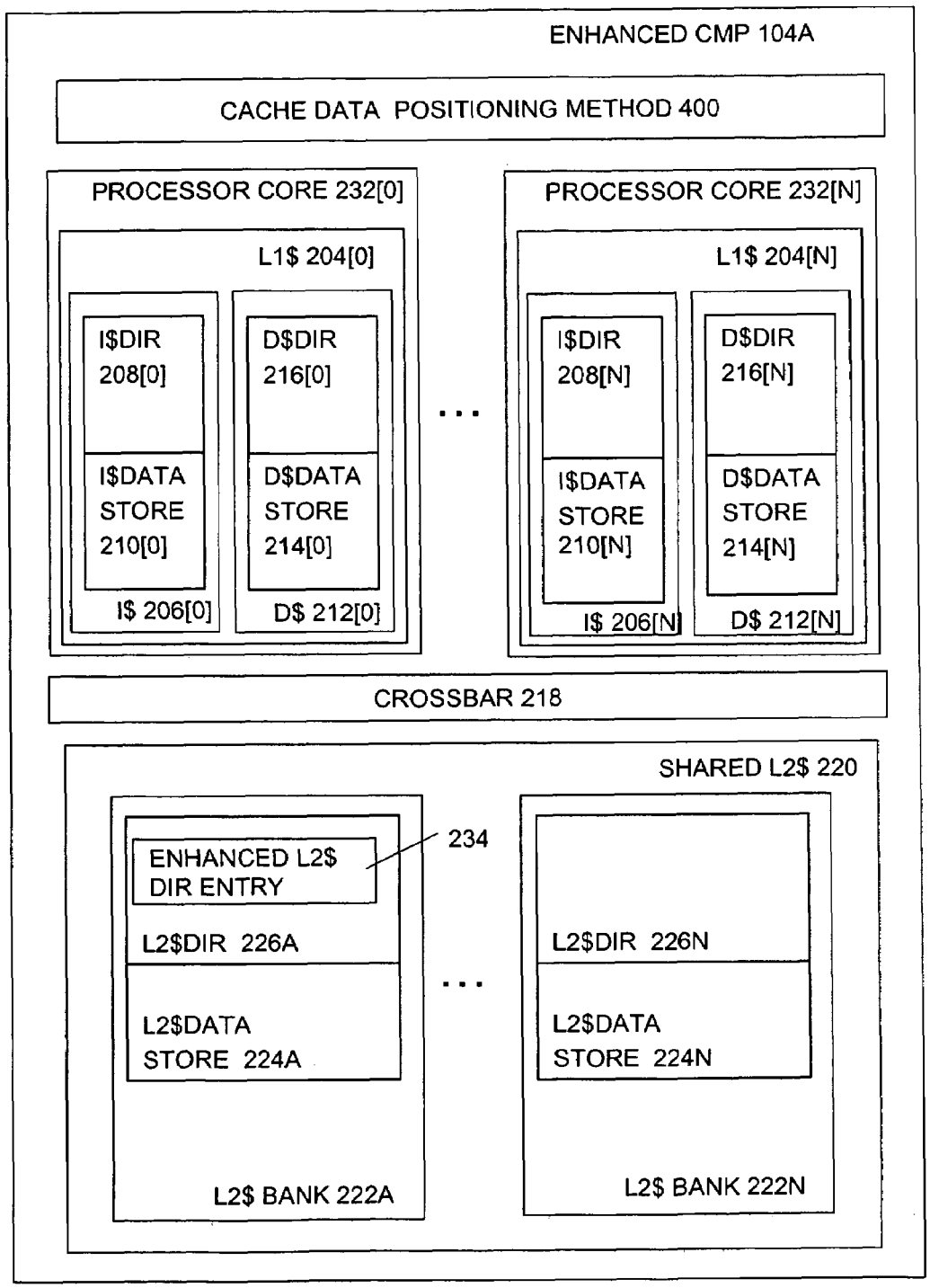
FIG. 2 illustrates a block diagram of the enhanced chip multiprocessor (CMP) of FIG. 1 in accordance with one embodiment of the invention.

FIG. 2 illustrates a block diagram of enhanced chip multiprocessor (CMP) 104 of FIG. 1 in accordance with one embodiment of the invention.

Referring now to FIG. 2, in one embodiment, enhanced CMP 104A includes one or more processor cores 232[0]-232[N]. Each processor core 232[0]-232[N] further includes at least one first level cache, or core cache, herein termed an L1 cache, i.e., respectively, L1 cache 204[0]-204[N]. For example, processor core 232[0] includes an L1 cache 204[0].

In one embodiment, each L1 cache further includes one or more sub-caches, such as an I cache and a D cache. For example, L1 cache 204[0] includes an I cache 206[0] and a D cache 212[0].

In the present embodiment, each sub-cache of an L1 cache includes an L1 cache directory and an L1 cache data store. For example, I cache 206[0] includes at least an I cache directory 208[0] and an I cache data store 210[0]. I cache directory 208[0] stores entries that identify the location of data lines stored in I cache data store 210[0]. D cache 212[0] includes at least a D cache directory 216[0] and a D cache data store 214[0]. D cache directory 216[0] stores entries that identify the location of data lines stored in D cache data store 214[0].

In the present embodiment, enhanced CMP 104A also includes a shared second level cache, herein termed a shared L2 cache, which is shared by processor cores 232[0]-232[N]. Processor cores 232[0]-232[N] are communicatively coupled with shared L2 cache 220 via a crossbar 218.

In one embodiment, shared L2 cache 220 includes one or more L2 cache banks 222A-222N. Each L2 cache bank 222A-222N further includes an L2 cache directory and an L2 cache data store. For example, L2 cache bank 222A includes an L2 cache directory 226A and an L2 cache data store 224A.

In one embodiment, shared L2 cache 220 includes at least one enhanced L2 cache directory entry that identifies a data line stored in enhanced CMP 104A. For example, as illustrated in FIG. 2, L2 cache directory 226A includes an enhanced L2 cache directory entry 234. More particularly, in one embodiment, L2 cache 220 includes an enhanced L2 cache directory entry for each data line store in shared L2 cache 220 and/or in an L1 cache 204[0]-204[N].

In one embodiment, the enhanced L2 cache directory entry, e.g., enhanced L2 cache directory entry 234, includes a cache mask value, herein also referred to as a cache mask, that indicates a storage state of an associated data line in shared L2 cache 220 and in L1 caches 204[0]-204[N]. One example of an embodiment of an enhanced L2 cache directory entry, e.g., enhanced L2 cache directory entry 234, is further described with reference to FIG. 3.

In one embodiment, enhanced CMP 104A further includes a cache data positioning method 400 used in positioning data in shared L2 cache 220 and/or in L1 caches 204[0]-204[N] based upon the sharing of the data, and for generating/modifying the enhanced L2 cache directory entry. One embodiment of method 400 is further described herein with reference to FIGS. 4A-4F and FIGS. 5-17B.

Figure 3:
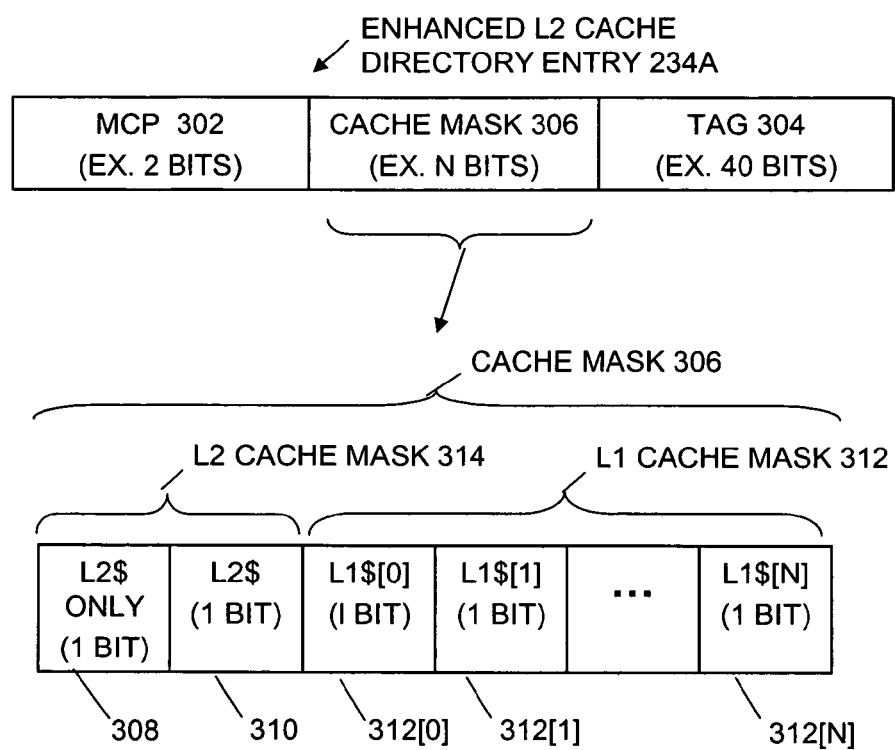
FIG. 3 illustrates a block diagram of the enhanced L2 cache directory entry of FIG. 2 in accordance with one embodiment of the invention.

FIG. 3 illustrates a block diagram of enhanced L2 cache directory entry 234 of FIG. 2 in accordance with one embodiment of the invention. Referring now to FIG. 3, in one embodiment, enhanced L2 cache directory entry 234A includes at least a memory coherence protocol (MCP) value 302, a tag value 304, and, different from a conventional L2 cache directory entry, a cache mask value 306.

As earlier described, an MCP value, for example, two (2) bits, indicates one or more memory coherence states of a data line in accordance with a particular cache memory coherence protocol, e.g., MOESI, MSI, MESI, and MOSI protocols. For example, typically the MOESI protocol uses a two (2) bit MCP value to indicate a state of a cache line as either: modified, owned, exclusive, shared, or invalid.

Herein the present invention is described with reference to the MOESI protocol, however, this is for purposes of description of the invention, and is not intended to limit the invention to the example described herein. Those of skill in the art can understand that other memory coherency protocols can also be used in the present invention, e.g., MSI, MESI, and MOSI protocols, and that different MCP values can be used.

Also as earlier described, a tag value, for example, forty (40) bits, identifies an associated data line, and the location of the data line in a cache. In the present embodiment, the location of the data line can be in shared L2 cache 220 or in an L1 cache 204[0]-204[N].

In one embodiment, cache mask value 306 includes an L2 cache mask value 314, herein also referred to as an L2 cache mask 314, and an L1 cache mask value 312, herein also referred to as an L1 cache mask 312. L2 cache mask value 314 further includes an L2 cache only value 308, and an L2 cache value 310. L1 cache mask 312 further includes one or more L1 cache values 312[0]-312[N]. Each L1 cache value 312[0]-312[N] is associated with a different respectively corresponding L1 cache 204[0]-204[N] in enhanced CMP 104A.

In one embodiment, L2 cache only value 308 is a value, for example, 1 bit, indicating a storage state of a data line in the L2 cache, and, more particularly, indicates if an associated data line is only stored in the L2 cache, e.g., shared L2 cache 220. For example, in one embodiment, an L2 cache only value 308 set to one (1) indicates the associated data line is only stored in shared L2 cache 220, and not in any of L1 caches 204[0]-204[N]. Alternatively, an L2 cache only value 308 set to zero (0), does not indicate the associated data line is only stored in shared L2 cache 220. The present example value convention as used herein is for purposes of description of the invention, and is not intended to limit the invention to the example described herein. Thus, it can be understood by those of skill in the art that the above exemplary value convention can be reversed, or that an entirely different value convention can be used.

In one embodiment, L2 cache value 310, is a value, for example, one bit, indicating a storage state of a data line in the L2 cache, and, more particularly, indicates if an associated data line is stored in the L2 cache. Thus, L2 cache value 310 does not indicate if a data line is exclusively or non-exclusively stored in shared L2 cache 220, merely that the data line is stored in L2 cache 220. For example, in one embodiment, an L2 cache value 310 set to one (1) indicates the associated data line is stored in shared L2 cache 220. Alternatively, an L2 cache value 310 set to zero (0) indicates the associated data line is not stored in shared L2 cache 220.

In one embodiment, each L1 cache value 312[0]-312[N] indicates a storage state of a respectively corresponding L1 cache 204[0]-204[N], and, more particularly, indicates if a data line is stored in an associated L1 cache 204[0]-204[N]. For example, L1 cache [0] value 312[0] is a value, for example, one bit, indicating a storage state of a data line in L1 cache 204[0]. As another example, L1 cache [1] value 312[1] is a value, for example, one bit L[1], indicating a storage state of a data line in L1 cache 204[1] (not separately shown in FIG. 2, but indicated by the ellipses).

In one embodiment, when L2 cache only value 308 is set to zero (0), the values in L1 cache mask 312 indicate the current storage state of the associated data line in the respective L1 caches 204[0]-204[N]. Alternatively, in one embodiment, when L2 cache only value 308 is set to one (1), i.e., indicating an associated data line is only stored in shared L2 cache 220, the values in L1 cache mask 312 are set to indicate whether the associated data line was previously stored in the respective L1 cache 204[0]-204[N], and can be used as predictive information in determining a positioning of the associated data line in L1 caches 204[0]-204[N] and/or shared L2 cache 220.

Thus, for example, and continuing the earlier bit value convention, if L2 cache only value 308 is set to zero (0), and the L1 cache [0] value 312[0] is set to one (1), the associated data line is stored in L1 cache 204[0]. Alternatively, if L2 cache only value 308 is set to zero (0), and L1 cache [0] value 312[0] is set to zero (0), the associated data line is not stored in L1 cache 204[0].

As another example, if L2 cache only value 308 is set to one (1), and L1 cache [0] value 312[0] is set to one (1), the associated data line is not currently stored in L1 cache 204[0], but was previously stored in L1 cache 204[0]. Alternatively, if L2 cache only value 308 is set to one (1), and L1 cache [0] value 312[0] is set to zero (0), the associated data line is not currently stored in L1 cache 204[0], and was not previously stored in L1 cache 204[0].

In one embodiment, there is at least one enhanced L2 cache directory entry, e.g., enhanced L2 cache directory entry 234A, in the shared L2 cache, e.g., shared L2 cache 220, for each data line stored in an L1 cache 204[0]-204[N] and/or shared L2 cache 220 of enhanced CMP 104. This is in contrast to conventional shared L2 cache directory entries that only identify data lines stored in the shared L2 cache.

Further, as described above, in one embodiment, the enhanced L2 cache directory entry, e.g., enhanced L2 cache directory entry 234A, includes a cache mask 306 that indicates a storage state of an associated data line in L1 caches 204[0]-204[N] and in shared L2 cache 220 of enhanced CMP 104. Again, this is contrast to conventional shared L2 cache directory entries that do not indicate the storage state of an associated data line in the L1 caches and in the shared L2 cache of a conventional CMP.

In one embodiment, an enhanced L2 cache directory entry is generated by enhanced CMP 104 in accordance with cache data positioning method 400 for each data line stored in L1 cache 204[0]-204[N] and/or shared L2 cache 220 of enhanced CMP 104. In one embodiment, an access request for a data line is generated by a requesting processor core 232[0]-232[N], the data line is obtained, if necessary, and the data line is stored in and/or evicted from one or more of L1 caches 204[0]-204[N] and/or shared L2 cache 220 of enhanced CMP 104 based on the sharing of the data line.

In one embodiment, an associated enhanced L2 cache directory entry is generated or modified, as needed, to reflect the resultant positioning of the data line. In some instances, the enhanced L2 cache directory entry is used to provide predictive information for use in determining the positioning of the data line. An example of one embodiment of cache data positioning method 400 is further described herein with reference to FIG. 4.

Figure 4A:
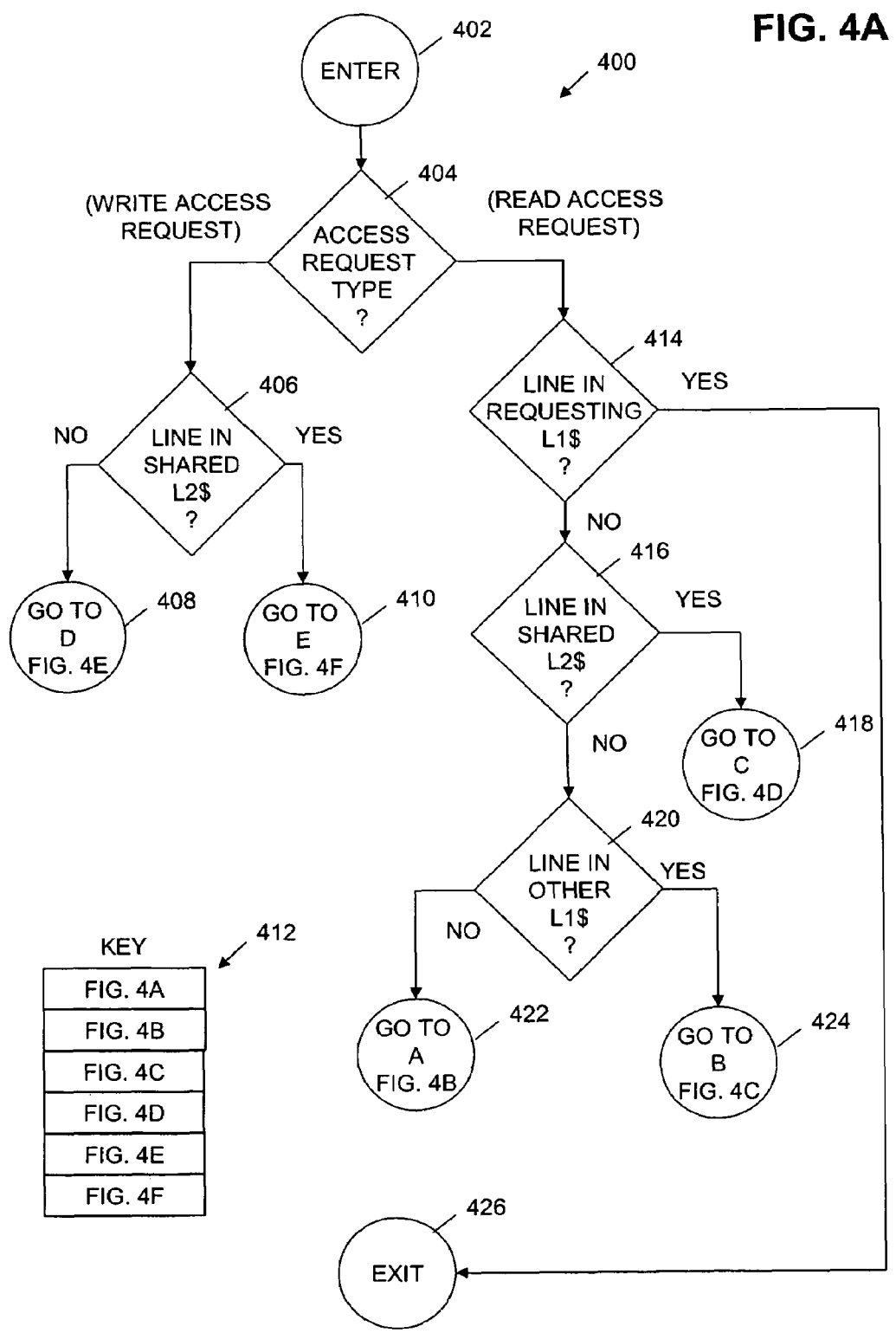
FIGS. 4A, 4B, 4C, 4D, 4E, and 4F illustrate a process flow diagram of a method for dynamically positioning data in one or more caches of a chip multiprocessor (CMP) in accordance with one embodiment of the invention.

FIGS. 4A, 4B, 4C, 4D, 4E, and 4F and illustrates a process flow diagram of a method 400 for dynamically positioning data in one or more caches of a chip multiprocessor (CMP) in accordance with one embodiment of the invention. In FIG. 4A, table 412 is a key to FIGS. 4A, 4B, 4C, 4D, 4E, and 4F. In the present embodiment, it is assumed that enhanced CMP 104A (FIG. 2) includes shared L2 cache 220, a requesting processor core, e.g., processor core 232[0] having L1 cache 204[0], and that enhanced CMP 104A further includes one other processor core, e.g., processor core 232[1] having L1 cache 204[1]. Further in one embodiment, shared L2 cache 220 and L1 caches 204[0]-204[N] are write-through caches. The present example is for purposes of example and description and is not intended to limit the invention to the example described herein. Referring now to FIGS. 2 and 4 together, in one embodiment, execution of cache data positioning method 400 by enhanced CMP processor 104A results in the operations of method 400 as described below.

In one embodiment, an access request identifying a data line is generated by a requesting processor core, such as by an execution unit (not shown) of processor core 232[0], and method 400 is entered at an ENTER operation 402. In one embodiment, the access request identifies at least the type of access requested, such as a read access or a write access, and a tag identifying the requested data line to be accessed. From ENTER operation 402, processing transitions to an ACCESS REQUEST TYPE check operation 404.

In ACCESS REQUEST TYPE check operation 404, a determination is made whether or not the access request is a read access request or a write access request. Herein, in one embodiment, a read access request is a load request, an instruction access request, a read prefetch request, and an instruction prefetch access request. Herein in one embodiment, a write access request is a store request, and a write prefetch request. In one embodiment, a read access request, and a write access request, identify a requested data line.

In the present embodiment, ACCESS REQUEST TYPE check operation 404 is included to provide a clearer description of the present invention. It can be understood by those of skill in the art that the functions of operation 404 can be variously implemented by enhanced CMP 104A, such as by a process or circuit for routing access requests generated by processor cores 232[0]-232[N].

If the access request is a read access request, processing transitions from ACCESS REQUEST TYPE check operation 404 to a LINE IN REQUESTING L1 CACHE check operation 414. If the access request is a write access request, processing transitions from ACCESS REQUEST TYPE check operation 404, to a LINE IN SHARED L2 CACHE check operation 406, further described herein.

Referring now to LINE IN REQUESTING L1 CACHE check operation 414, in one embodiment, a determination is made whether or not the requested data line is stored in the L1 cache of the requesting processor core, for example, in L1 cache 204[0] of processor core 232[0]. For example, the L1 cache of the requesting processor core, e.g., L1 cache 204[0], is queried for the tag identifying the requested data line. If the requested data line is present in the L1 cache of the requesting processor core, e.g., is present in L1 cache 204[0] ("YES"), the data line is returned to the execution unit of the requesting processor core. From LINE IN REQUESTING L1 CACHE check operation 414, processing transitions to an EXIT operation 426, with processing exiting method 400.

Referring again to LINE IN REQUESTING L1 CACHE check operation 414, alternatively, if the requested data line is not present in an L1 cache of the requesting processor core, e.g., is not present in L1 cache 204[0] ("NO"), processing transitions from LINE IN REQUESTING L1 CACHE check operation 414 to a LINE IN SHARED L2 CACHE check operation 416.

In LINE IN SHARED L2 CACHE check operation 416, in one embodiment, a determination is made whether or not the requested data line is found in the shared L2 cache, e.g., shared L2 cache 220. For example, shared L2 cache 220 is queried for the tag identifying the requested data line. If the requested data line is not present in shared L2 cache 220 ("NO"), from LINE IN SHARED L2 CACHE check operation 416, processing transitions to a LINE IN OTHER L1 CACHE check operation 420. Otherwise, if the requested data line is present in shared L2 cache 220, for example, is present in L2 cache data store 224A ("YES"), processing transitions from LINE IN SHARED L2 CACHE check operation 416, at operation 418, to an OBTAIN LINE operation 446 (FIG. 4D) described further herein.

Referring now to LINE IN OTHER L1 CACHE check operation 420, in one embodiment, a determination is made whether or not the requested data line is found in an L1 cache of another processor core, i.e., in L1 cache 204[1]-204[N]. For example, each of the other L1 caches 204[1]-204[N] are queried for the tag identifying the requested data line. Thus, in contrast to conventional CMPs in which a requested data line is obtained off-chip if the requested data line is not present in the requesting L1 cache or in the shared L2 cache, in one embodiment, the L1 caches of the other processor cores, are queried to determine whether the requested data line can be obtained on chip before attempting to locate the requested data line off chip.

Figure 4B:
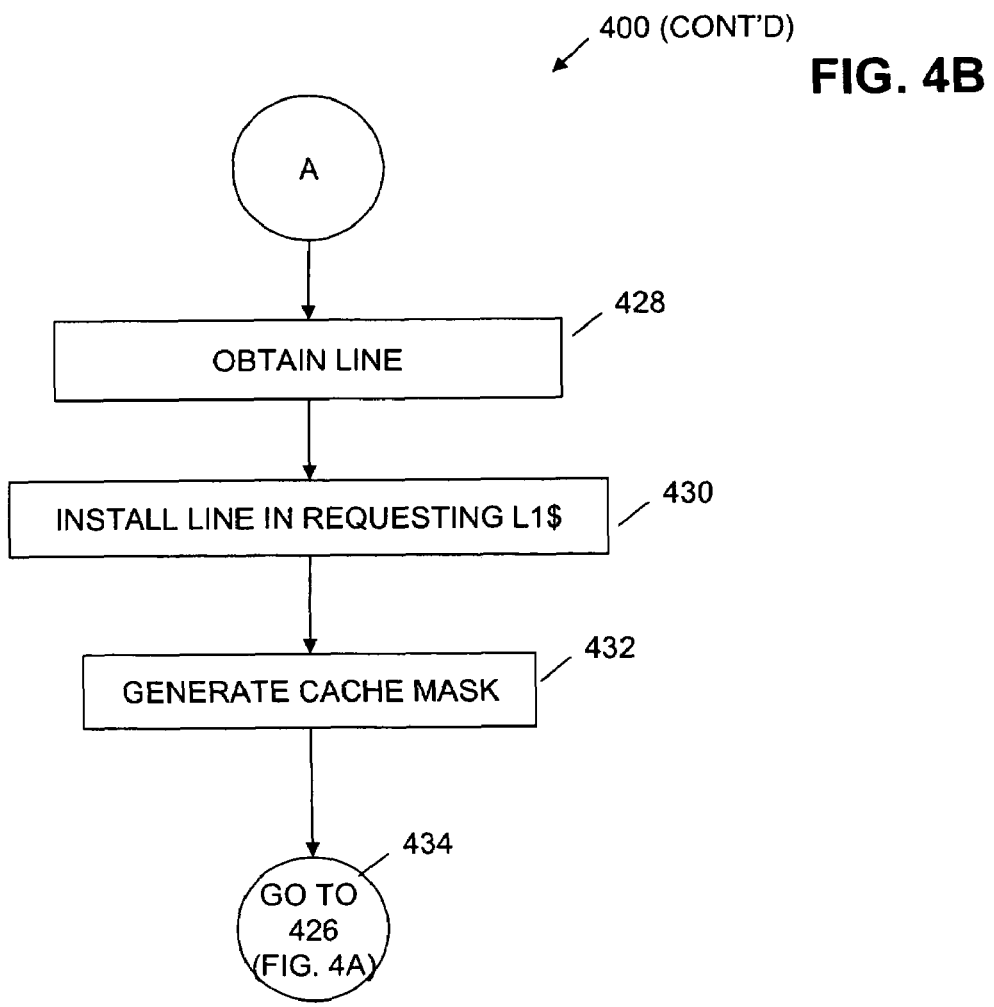

If the requested data line is not present in an L1 cache of another processor core ("NO"), processing transitions from LINE IN OTHER L1 CACHE check operation 420, at operation 422, to an OBTAIN LINE operation 428 (FIG. 4B). Alternatively, if the requested data line is present in an L1 cache of another processor core ("YES"), processing transitions from LINE IN OTHER L1 CACHE check operation 420, at operation 424, to an OBTAIN LINE operation 436 (FIG. 4C) described further herein.

Referring now generally to FIG. 4B, in one embodiment, when a requesting processor core issues a read access request, and the requested data line is not present in an L1 cache of the requesting processor core, is not present in the shared L2 cache, and the associated enhanced L2 cache directory entry, if any, indicates that an L1 cache of another processor core does not have the requested data line, the requested data line is obtained from an off-chip memory structure. The requested data line is installed in the L1 cache of requesting processor core, and not in the shared L2 cache, nor in an L1 cache of another processor core.

Thus, in OBTAIN LINE operation 428, in one embodiment, if the requested data line is not present in an L1 cache of another processor core, the requested data line is obtained from an off chip memory structure, for example off chip from an L3 cache, e.g., L3 cache 106 (FIG. 1), or from main memory, e.g., main memory 108 (FIG. 1). From OBTAIN LINE operation 428, processing transitions to an INSTALL LINE IN REQUESTING L1 CACHE operation 430.

In INSTALL LINE IN REQUESTING L1 CACHE operation 430, the requested data line obtained in operation 428, is installed in the requesting L1 cache. For example, in one embodiment, the requested data line is installed in D cache data store 214[0] of L1 cache 204[0] of processor core 232[0]. When installed, the requested data line is available for use by the requesting processor core, e.g., processor core 232[0]. From INSTALL LINE IN REQUESTING L1 CACHE operation 430, processing transitions to a GENERATE CACHE MASK operation 432.

In GENERATE CACHE MASK OPERATION 432, in one embodiment, an enhanced L2 cache directory entry including a cache mask is generated in shared L2 cache 220 corresponding to the requested data line. If an earlier enhanced L2 cache directory entry, i.e., an initial state, is already present in shared L2 cache 220, in one embodiment, the initial state is updated, i.e., modified, to indicate the current positioning of the requested data line. An example of a cache mask of an enhanced L2 cache directory entry is further described herein with reference to FIG. 5.

Figure 5:
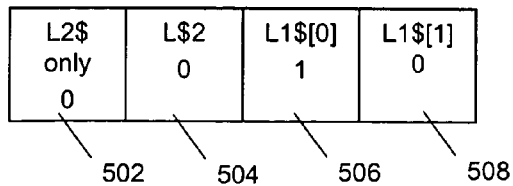
FIG. 5 illustrates one example of a state of a cache mask in an enhanced L2 cache directory entry generated in accordance with one embodiment of the invention.

FIG. 5 illustrates one example of a state of a cache mask in an enhanced L2 cache directory entry generated in accordance with one embodiment of the invention. In FIG. 5, assuming processor core 232[0] requested the data line, the L1 cache [0] value 506 is set to one [1] indicating that the associated data line is now stored in L1 cache 204[0] of processor core 232[0].

As the requested data line was not already present in a cache of enhanced CMP 104A, the L2 cache only value 502, the L2 cache value 504, and the L1 [1] cache value 508 are all set to zero (0). Thus, in contrast to conventional CMPs in which the requested data line would have been stored in both the shared L2 cache and the requesting L1 cache, in the present embodiment, the requested data line is only stored in the requesting L1 cache, e.g., L1 cache 204[0]. Referring again to FIG. 4B, from GENERATE CACHE MASK operation 432, processing transitions, at operation 434, to operation EXIT 426 (FIG. 4A) with processing exiting method 400.

Figure 4C:
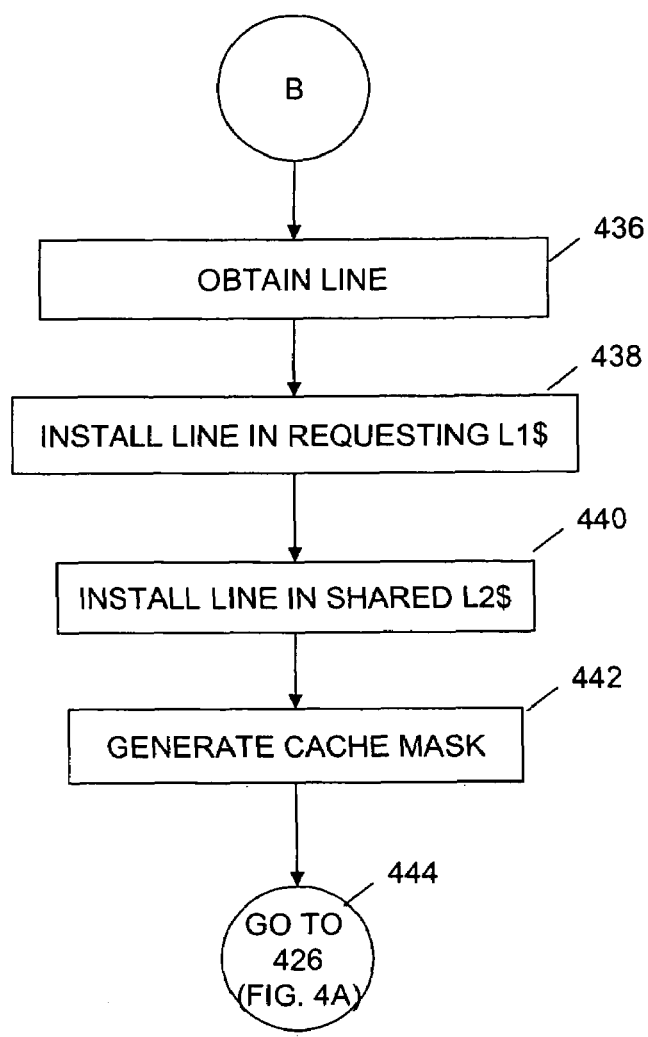

Referring now again to FIG. 4A and LINE IN OTHER L1 CACHE check operation 420, alternatively, if the requested data line is found in an L1 cache of another processor core, i.e., an L1 cache other than the L1 cache of the requesting processor core ("YES"), processing transitions to an OBTAIN LINE operation 436 (FIG. 4C).

Referring now generally to FIG. 4C, in one embodiment, when a requesting processor core issues a read access request, and the requested data line is not present in an L1 cache of the requesting processor core, is not present in the shared L2 cache, and an L1 cache of one or more other processor cores has the requested line, the requested data line is obtained from the L1 cache of the other processor core. The requested data line is installed in the L1 cache of the requesting processor core and installed in the shared L2 cache.

Thus, in OBTAIN LINE operation 436, in one embodiment, the requested data line is obtained from an L1 cache of another processor core in which the requested data line is located. For example, assume the requested data line is located in L1 cache 204[1] (not shown) of a processor core 232[i] (not shown); the line is obtained form L1 cache 204[1]. From OBTAIN LINE operation 436, processing transitions to an INSTALL LINE IN REQUESTING L1 CACHE operation 438.

In INSTALL LINE IN REQUESTING L1 CACHE operation 438, the requested data line obtained in operation 436 is installed in the L1 cache of the requesting processor core, i.e., the requesting L1 cache. For example, in one embodiment, the requested data line is installed in D cache data store 214[0] of L1 cache 204[0] of processor core 232[0]. When installed, the requested data line is available for use by the requesting processor core, e.g., processor core 232[0]. From INSTALL LINE IN REQUESTING L1 CACHE operation 438, processing transitions to an INSTALL LINE IN SHARED L2 CACHE operation 440.

In INSTALL LINE IN SHARED L2 CACHE operation 440, the requested data line is also installed in the shared L2 cache. For example, the requested data line is also installed in an L2 cache data store, e.g., L2 cache data store 224A of shared L2 cache 220. The requested data line now exists in one or more L1 caches, e.g., L1 cache 204[0] and L1 cache 204[1], as well as in the shared L2 cache, e.g., shared L2 cache 220, as the requested data line is shared by two or more processor cores. From INSTALL LINE IN SHARED L2 CACHE operation 440, processing transitions to a GENERATE CACHE MASK operation 442.

In GENERATE CACHE MASK OPERATION 442, an enhanced L2 cache directory entry including a cache mask is generated in shared L2 cache 220 corresponding to the requested data line. If an earlier enhanced L2 cache directory entry, i.e., an initial state, is already present in shared L2 cache 220, in one embodiment, the initial state is updated, i.e., modified, to indicate the current positioning of the requested data line, i.e., modified to a subsequent state. An example of an update of a cache mask of an enhanced L2 cache directory entry is further described herein with reference to FIG. 6A and FIG. 6B.

Figure 6A:
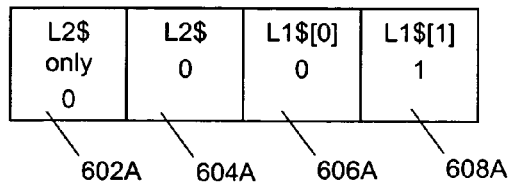
FIG. 6A illustrates another example of an initial state of a cache mask in an enhanced L2 cache directory entry in accordance with one embodiment of the invention.

FIG. 6A illustrates one example of an initial state of a cache mask of an enhanced L2 cache directory entry associated with a requested data line that is not present in the L1 cache of a requesting processor core, not present in the shared L2 cache, but is present in an L1 cache of another processor core in accordance with one embodiment of the invention. In FIG. 6A, in one embodiment, as the requested data line is not present in L1 cache 204[0] of requesting processor core 232[0] and is not present in shared L2 cache 220, the L1 cache [0] value 606A and the L2 cache value 604A are each set to zero (0). As the requested data line is present in an L1 cache of another processor core, e.g., L1 cache 204[1], the L1 cache [1] value 608A is set to one (1) and the L2 cache only value is set to (0).

Figure 6B:
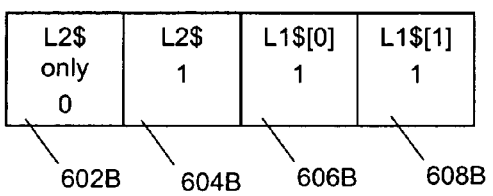
FIG. 6B illustrates one example of a subsequent state of the cache mask of FIG. 6A in accordance with one embodiment of the invention.

FIG. 6B illustrates a subsequent state of the cache mask of the enhanced L2 cache directory entry of FIG. 6A modified to indicate the installation of the requested data line in an L1 cache of the requesting processor core and in the shared L2 cache in accordance with one embodiment of the invention. In FIG. 6B, as processor core 232[0] requested the data line, the L1 cache [0] value 606B is set to one (1) indicating that the data line is now stored in L1 cache 204[0] of processor core 232[0].

Further the L2 cache value 604B is also set to one (1) indicating that the requested data line is stored in shared L2 cache 220. The L2 cache only value 602B remains set to zero (0) as the requested data line is present in L2 cache 220 and in one or more L1 caches, and the L1 cache [1] value 608B remains set to one (1). Referring again to FIG. 4C, from GENERATE CACHE MASK operation 442, processing transitions, at operation 444, to EXIT operation 426 (FIG. 4A) with processing exiting method 400.

Figure 4D:
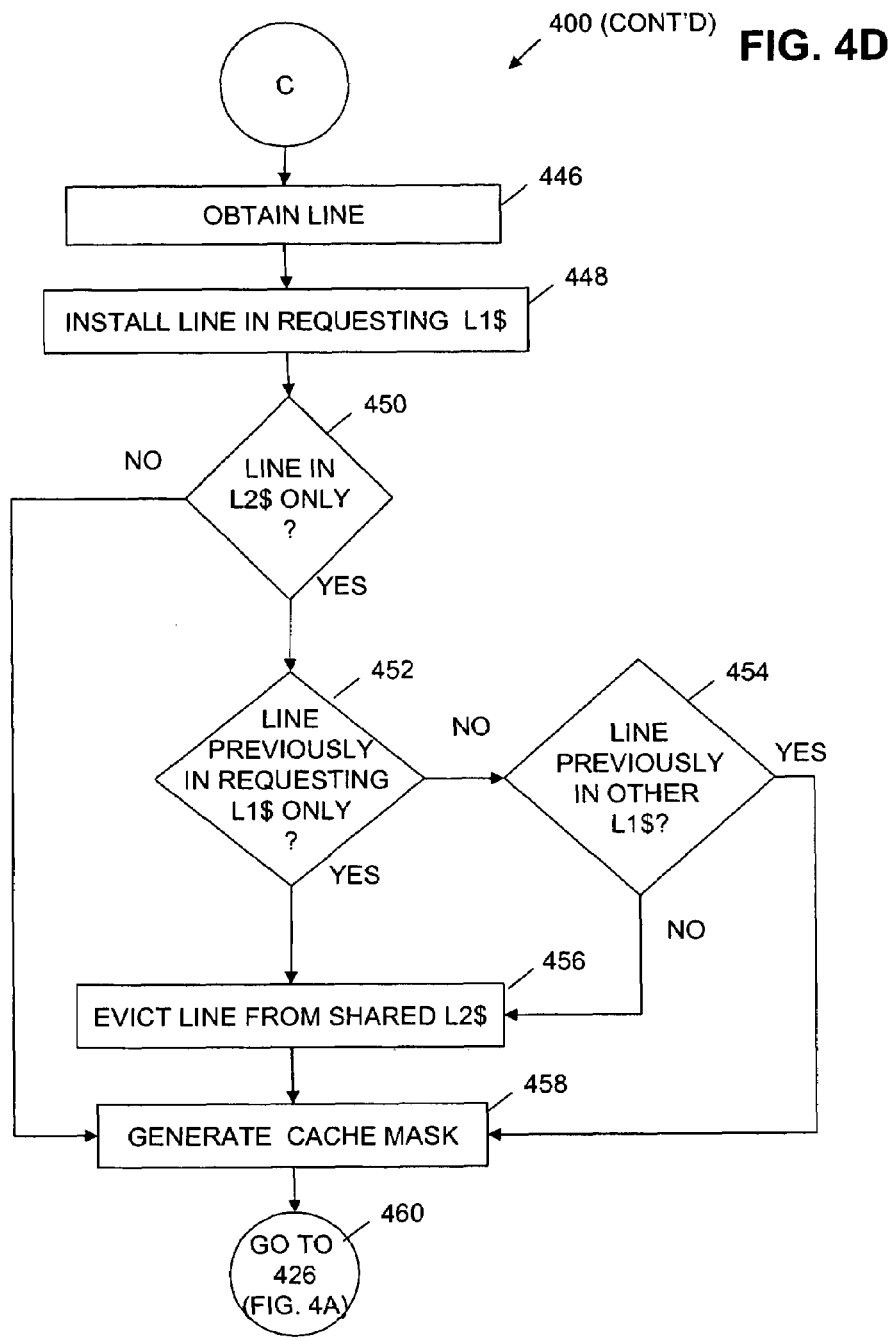

Referring now again to FIG. 4A and LINE IN SHARED L2 CACHE check operation 416, alternatively, if the requested data line is not found in the requesting L1 cache, but is found in the shared L2 cache ("YES"), from LINE IN SHARED L2 CACHE check operation 416, processing transitions to an OBTAIN LINE operation 446 (FIG. 4D).

Referring now generally to FIG. 4D, in one embodiment, when a requesting processor core issues a read access request, and the requested data line is not present in an L1 cache of the requesting processor core, and is present in the shared L2 cache, the requested data line is obtained from the shared L2 cache and installed in the L1 cache of requesting processor core. Further, if either 1) no L1 cache previously had a copy of the requested data line, or 2) an L1 cache of the requesting processor core is the only L1 cache to previously have a copy of the requested data line, the data line is invalidated in the shared L2 cache.

Thus, in OBTAIN LINE operation 446, in one embodiment, the requested data line is obtained from the shared L2 cache in which the requested data line is located, e.g., from shared L2 cache 220. From OBTAIN LINE operation 446, processing transitions to an INSTALL LINE IN REQUESTING L1 CACHE operation 448.

In INSTALL LINE IN REQUESTING L1 CACHE operation 448, the requested data line obtained in operation 446 is installed in the requesting L1 cache. For example, in one embodiment, the requested data line is installed in D cache data store 214[0] of L1 cache 204[0] of processor core 232[0]. When installed, the requested data line is available for use by the requesting processor core, e.g., processor core 232[0]. From INSTALL LINE IN REQUESTING L1 CACHE operation 448, processing transitions to a LINE IN L2 CACHE ONLY check operation 450.

In LINE IN L2 CACHE ONLY check operation 450, in one embodiment, a determination is made whether or not the requested data line is only present in the shared L2 cache, e.g., is not present in any of the L1 caches, e.g., L1 caches 204[0]-204[N]. In one embodiment, the L2 cache only value of the enhanced L2 cache directory entry associated with the requested data line, e.g., L2 cache only value 308 (FIG. 3) is evaluated to determine whether or not the requested data line is only present in the shared L2 cache. For example, if L2 cache only value 308 is set to one (1) the requested data line is only stored in shared L2 cache 220, otherwise if L2 cache only value 308 is set to zero(0), the requested data line is not only stored in shared L2 cache 220.

Recall that at this point, the requested data line is not in the L1 cache of the requesting processor core, but is present in the shared L2 cache. When the requested data line is present in the shared L2 cache only, the requested data line is not present in an L1 cache 204[0]-204[N]. In one embodiment, when the requested data line is present in the shared L2 cache only, the L1 cache mask of the enhanced L2 cache directory entry is used to indicate a storage history of the associated data line in the one or more L1 caches, e.g., L1 caches 204[0]-204[N].

This permits the enhanced L2 cache directory entry to provide predictive information for use in positioning of the data line in the caches of enhanced CMP 104A as further described herein.

Thus, if the requested data line is not present in the L2 cache only ("NO"), processing transitions from LINE IN L2 CACHE ONLY check operation 450 to a GENERATE CACHE MASK operation 458. Otherwise, if the requested data line is present in the L2 cache only ("YES"), processing transitions from LINE IN L2 CACHE ONLY check operation 450 to a LINE PREVIOUSLY IN REQUESTING L1 CACHE ONLY check operation 452 further described herein.

In GENERATE CACHE MASK operation 458, in one embodiment, an enhanced L2 cache directory entry including a cache mask is generated in shared L2 cache 220 corresponding to the requested data line. If an earlier enhanced L2 cache directory entry, i.e., an initial state, is already present in shared L2 cache 220, in one embodiment, the initial state is updated, i.e., modified, to indicate the current positioning of the requested data line. An example of an update of a cache mask of an enhanced L2 cache directory entry is further described herein with reference to FIG. 8A and FIG. 8B.

Figure 8A:
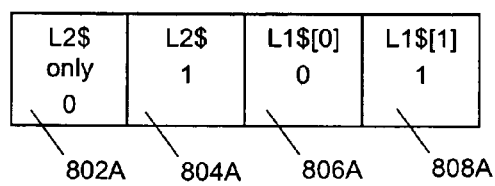
FIG. 8A illustrates another example of an initial state of a cache mask in an enhanced L2 cache directory entry in accordance with one embodiment of the invention.

FIG. 8A illustrates one example of an initial state of a cache mask of an enhanced L2 cache directory entry associated with a requested data line that is present in a shared L2 cache as well as in another L1 cache other than a requesting L1 cache in accordance with one embodiment of the invention. In FIG. 8A, in one embodiment, as the requested data line is present in the shared L2 cache, but not present in the shared L2 cache only, the L2 cache only value 802A is set to zero (0) and the L2 cache value 804A is set to one (1). In the present example, the requested data line, which is not present in the requesting L1 cache, e.g., L1 cache 204[0] is present in another L1 cache, e.g., in L1 cache 204[1], thus the L1 cache [0] cache value 806A is set to zero (0) and the L1 cache [1] value 808A is set to one (1).

Figure 8B:
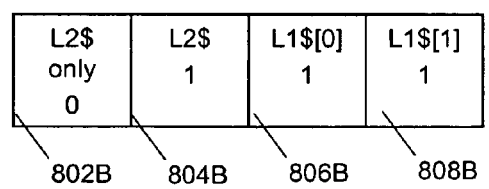
FIG. 8B illustrates one example of a subsequent state of the cache mask of FIG. 6A in accordance with one embodiment of the invention.

FIG. 8B illustrates one example of a subsequent state of the cache mask of the enhanced L2 cache directory entry of FIG. 8A modified to indicate the installation of a requested data line in an L1 cache of a requesting L1 processor core in accordance with one embodiment of the invention. In FIG. 8B, as the data line was installed in the requesting L1 cache, e.g., L1 204[0], the L1 cache [0] value 806B is now set to one (1) indicating that the requested data line is now stored in the L1 cache 204[0].

The L1 cache [1] value 808B remains set to one (1) as the data line is still present in L1 cache 204[1]. Further, the L2 cache only value 802B remains set to zero (0) and the L2 cache value 804B remains set to one (1) as the data line is stored in the shared L2 cache as well as in an L1 cache. Referring again to FIG. 4D, from GENERATE CACHE MASK operation 458, processing transitions, at operation 460, to EXIT operation 426 (FIG. 4A) with processing exiting method 400.

Referring now back again to FIG. 4D, and LINE IN L2 CACHE ONLY check operation 450, alternatively, if the requested data line is present in the L2 cache only ("YES"), processing transitions from LINE IN L2 CACHE ONLY check operation 450 to a LINE PREVIOUSLY IN REQUESTING L1 CACHE ONLY check operation 452.

In LINE PREVIOUSLY IN REQUESTING L1 CACHE ONLY check operation 452, a determination is made whether or not the requested data line was previously stored in the requesting L1 cache only. In one embodiment, the L1 cache mask of the enhanced L2 cache directory entry associated with the requested data line, e.g., L1 cache mask 312 (FIG. 3), is evaluated to determine whether or not the L1 cache value for the requesting L1 cache, e.g., L1 cache [0] value 312[0], is set, for example, to one (1), and that the remaining L1 cache values, e.g., L1 cache [1] value 312[1], are set to zero (0).

If the requested data line was previously stored in the requesting L1 cache only ("YES"), from LINE PREVIOUSLY IN REQUESTING L1 CACHE ONLY check operation 452, processing transitions to an EVICT LINE FROM SHARED L2 CACHE operation 456. Otherwise, if the requested data line was not previously stored in the requesting L1 cache only ("NO"), from LINE PREVIOUSLY IN REQUESTING L1 CACHE ONLY check operation 452, processing transitions to a LINE PREVIOUSLY IN OTHER L1 CACHE check operation 454 further described herein.

In EVICT LINE FROM SHARED L2 CACHE operation 456, the requested data line is evicted from the shared L2 cache. As the requested data line is stored in the shared L2 cache only and was previously stored only in the requesting L1 cache, i.e., not in another L1 cache, space in the shared L2 cache is conserved by evicting the copy of the requested data line stored in the shared L2 cache, e.g., from shared L2 cache 220, and retaining a copy only in the L1 cache of the requesting processor core, e.g., L1 cache 204[0]. In this way private data, i.e., data private to the requesting L1 cache, does not pollute the shared L2 cache. From EVICT LINE FROM SHARED L2 CACHE operation 456, processing transitions to a GENERATE CACHE MASK operation 458.

In GENERATE CACHE MASK OPERATION 458, an enhanced L2 cache directory entry including a cache mask is generated in shared L2 cache 220 corresponding to the requested data line as earlier described. An example of an update of a cache mask of an enhanced L2 cache directory entry is further described herein with reference to FIG. 11A and FIG. 11B.

FIG. 11A illustrates an example of an initial state of a cache mask of an enhanced L2 cache directory entry associated with a requested data line that is present only in a shared L2 cache, and was previously present in the requesting L1 cache only in accordance with one embodiment of the invention. In FIG. 11A, in one embodiment, as the requested data line is present in the shared L2 cache only, e.g., the L2 cache only value 1102A and the L2 cache value 1104A are each set to one (1), and in one embodiment, the L1 cache mask is used to indicate the storage history of the data line in the L1 caches. In the present example, the data line was previously present in the requesting L1 cache only, e.g., L1 cache 204[0], thus the L1 cache [0] value 1106A is set to one (1) and the other L1 cache value (s), e.g., the L1 cache [1] value 1108A, are set to zero (0).

FIG. 11B illustrates an example of a subsequent state of the cache mask of the enhanced L2 cache directory entry of FIG. 11A modified to indicate the installation of the requested data line in an L1 cache of a requesting L1 processor core and the eviction of the data line from the shared L2 cache in accordance with one embodiment of the invention. In FIG. 11B, as the requested data line was installed in L1 cache 204[0], the L1 cache [0] value 1106B is set to one (1) indicating that the requested data line is now stored in L1 cache 204[0]. Further, as the data line was evicted from the shared L2 cache, the L2 cache only value 1102B and the L2 cache value 1104B are each set to zero (0). As the data line is not present in L1 cache 204[1], the L1 cache [1] value 1108B remains set to zero (0). Thus, the current cache mask indicates the current state of the data line and no longer indicates a storage history of the data line in the L1 caches. Referring again to FIG. 4D, from GENERATE CACHE MASK operation 458, processing transitions, at operation 460, to EXIT operation 426 (FIG. 4A) with processing exiting method 400.

Referring back again to LINE PREVIOUSLY IN REQUESTING L1 CACHE ONLY check operation 452, alternatively, when the requested data line was not previously stored in the requesting L1 cache only ("NO"), from LINE PREVIOUSLY IN REQUESTING L1 CACHE ONLY check operation 452, processing transitions to LINE PREVIOUSLY IN OTHER L1 CACHE check operation 454.

In LINE PREVIOUSLY IN OTHER L1 CACHE check operation 454, a determination is made whether or not the requested data line was previously stored in an L1 cache other than the requesting L1 cache. In one embodiment, the L1 cache mask of the enhanced L2 cache directory entry associated with the requested data line is evaluated to determine whether any of the other L1 cache values, e.g., 312[1]-312[N] (FIG. 3), are set to one (1), indicating the associated data line was previously stored in at least one L1 cache other than the requesting L1 cache.

If requested data line was not previously stored in another L1 cache ("NO"), in one embodiment, it is assumed that it is unlikely that the requested data line will be requested by the other L1 caches, and that the requested data line does not need to be stored in the shared L2 cache. From LINE PREVIOUSLY IN OTHER L1 CACHE check operation 454, processing transitions to an EVICT LINE FROM SHARED L2 CACHE operation 456. Otherwise, if the requested data line was previously stored in another L1 cache ("YES"), it is assumed that it is likely that the requested data line will be requested by the other L1 cache, and that the requested data line be stored in the shared L2 cache, and processing transitions from LINE PREVIOUSLY IN OTHER L1 CACHE check operation 454 to GENERATE CACHE MASK operation 458, further described herein.

In EVICT LINE FROM SHARED L2 CACHE operation 456, the requested data line is evicted from the shared L2 cache. As the requested data line is requested by the requesting L1 cache, e.g., L1 cache 204[0], and was not previously stored in the requesting L1 cache only or in any of the other L1 caches, space in the shared L2 cache is conserved by evicting the copy of the requested data line stored in the shared L2 cache, and retaining a copy only in the L1 cache of the requesting processor core, e.g., in L1 cache 204[0]. In this way private data, i.e., data private to the requesting L1 cache, does not pollute the shared L2 cache. From EVICT LINE FROM SHARED L2 CACHE operation 456, processing transitions to a GENERATE CACHE MASK operation 458.

In GENERATE CACHE MASK OPERATION 458, an enhanced L2 cache directory entry including a cache mask is generated in shared L2 cache 220 corresponding to the requested data line as earlier described. An example of an update of a cache mask of an enhanced L2 cache directory entry is further described herein with reference to FIG. 7A and FIG. 7B.

Figure 7A:
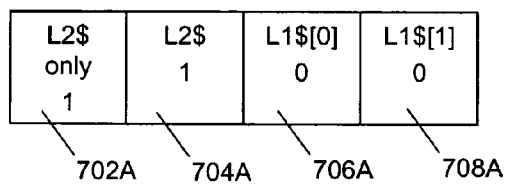
FIG. 7A illustrates another example of an initial state of a cache mask in an enhanced L2 cache directory entry in accordance with one embodiment of the invention.

FIG. 7A illustrates one example of an initial state of a cache mask of an enhanced L2 cache directory entry associated with a requested data line that is present only in a shared L2 cache, and was not previously present in an L1 cache in accordance with one embodiment of the invention. In FIG. 7A, as the requested data line is present only in the shared L2 cache, e.g., shared L2 cache 220, in one embodiment, the L2 cache only value 702A is set to one (1), and the L2 cache value 704A is set to one (1).

Thus, in the present embodiment, the L1 cache mask of the enhanced L2 cache directory entry is used to indicate a storage history of the associated data line in the one or more L1 caches, e.g., L1 caches 204[0]-204[N]. In the present example, the requested data line was not previously present in the requesting L1 cache, e.g., L1 cache 204[0], and was not present in another L1 cache, e.g., L1 cache 204[1], thus the L1 cache [0] value 706A, and the L1 cache [1] value 708A are each set to zero (0).

Figure 7B:
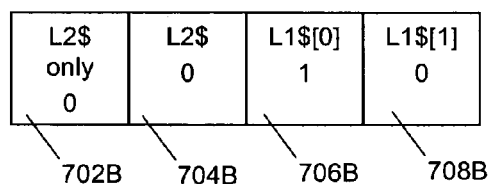
FIG. 7B illustrates one example of a subsequent state of the cache mask of FIG. 7A in accordance with one embodiment of the invention.

FIG. 7B illustrates a subsequent state of the cache mask of the enhanced L2 cache directory entry of FIG. 7A modified to indicate the installation of a requested data line in a requesting L1 cache and the eviction of the requested data line from the shared L2 cache in accordance with one embodiment of the invention. In FIG. 7B, as the requested data line was installed in L1 cache 204[0], the L1 cache [0] value 406B 706B is set to one (1) indicating that the requested data line is now stored in the requesting L1 cache.

Further, as the data line is evicted from shared L2 cache 220, the L2 cache only value 702B and L2 cache value 704B are set to zero (0) indicating that the requested data line is not present in shared L2 cache 220. As the data line is not present in L1 cache 204[1], the L1 cache [1] value 708B remains set to zero (0). Referring again to FIG. 4D, from GENERATE CACHE MASK operation 458, processing transitions, at operation 460, to EXIT operation 426 (FIG. 4A) with processing exiting method 400.

Referring back again to FIG. 4D and LINE PREVIOUSLY IN OTHER L1 CACHE check operation 454, alternatively, if the requested data line was not previously in the requesting L1 cache only, but was previously stored in another L1 cache ("YES"), from LINE PREVIOUSLY IN OTHER L1 CACHE check operation 454, processing transitions to GENERATE CACHE MASK operation 458.

In GENERATE CACHE MASK operation 458, an enhanced L2 cache directory entry including a cache mask is generated in shared L2 cache 220 corresponding to the requested data line as earlier described. Examples of an update of a cache mask of an enhanced L2 cache directory entry is further described herein with reference to FIGS. 9A and 9B, and FIGS. 10A and 10B.

Figure 9A:
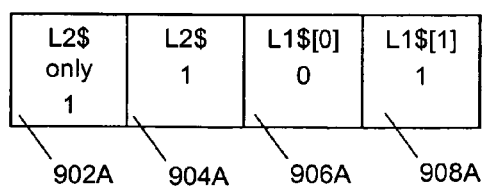
FIG. 9A illustrates another example of an initial state of a cache mask in an enhanced L2 cache directory entry in accordance with one embodiment of the invention.
Figure 9B:
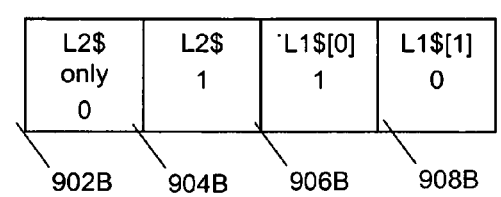
FIG. 9B illustrates one example of a subsequent state of the cache mask of FIG. 9A in accordance with one embodiment of the invention.

In the example illustrated in FIGS. 9A and 9B, the requested data line was not previously present in the requesting L1 cache only as the requested data line was not previously present in the requesting L1 cache, and the requested data line was previously present in another L1 cache. In the example illustrated in FIGS. 10A and 10B, the requested data line was not previously present in the requesting L1 cache only, as the requested data line was previously present in the requesting L1 cache and another L1 cache.

FIG. 9A illustrates an initial state of a cache mask of an enhanced L2 cache directory entry associated with a requested data line that is present in a shared L2 cache, was not previously present in the requesting L1 cache only, but was previously present in another L1 cache in accordance with one embodiment of the invention. In FIG. 9A, in one embodiment, as the requested data line is present in the shared L2 cache, e.g., shared L2 cache 220, in one embodiment, the L1 cache mask is used to indicate the storage history of the data line in the L1 caches.

In the present example, the L2 cache only value 902A and the L2 cache value 904A are each set to one (1). The requested data line was not previously present in the requesting L1 cache only, e.g., L1 cache 204[0], but was previously present in another L1 cache, e.g., L1 cache 204[1]. Thus, the L1 cache [0] value 906A is set to zero (0) and the L1 cache [1] value 908A is set to one (1).

FIG. 9B illustrates a subsequent state of the cache mask of the enhanced L2 cache directory entry of FIG. 9A modified to indicate the installation of the requested data line in the requesting L1 cache where the requested data line was previously stored in another L1 cache in accordance with one embodiment of the invention. In FIG. 9B, as the requested data line was installed in L1 cache 204[0], the L1 cache [0] value 906B is set to one (1) indicating that the requested data line is now stored in the requesting L1 cache.

Further, as the requested data line was previously stored in L1 cache 204[1], the data line is retained in the shared L2 cache, e.g., shared L2 cache 220. As the data line is no longer only stored in the shared L2 cache, the L2 cache only value 902B is set to zero (0) and the L2 cache value 904B remains set to one (1). As L2 cache only value 902B is no longer set to one (1), the L1 cache mask no longer serves to indicate a history of the storage of the data line in the L1 caches, and now reflects the current state of storage in the L1 mask. Thus, as the requested data line is not stored in L1 cache 204[1], the L1 cache [1] value 908B is set to zero (0).

FIG. 10A illustrates an initial state of a cache mask of an enhanced L2 cache directory entry associated with a requested data line that is present only in a shared L2 cache, and was previously present in the requesting L1 cache and in another L1 cache in accordance with one embodiment of the invention. In FIG. 10A, in one embodiment, as the requested data line is present in the shared L2 cache only, as earlier described, in one embodiment, the L1 cache mask is used to indicate a storage history of the data line in the L1 caches. In the present example, the L2 cache only value 1002A and the L2 cache value 1004A are each set to one (1). The requested data line was previously present in the requesting L1 cache, e.g., L1 cache 204[0], and was present in another L1 cache, e.g., L1 cache 204[1], thus the L1 cache [0] value 1006A is set to one (1) and the other L1 cache value(s), e.g., the L1 cache [1] value 1008A, is set to one (1).

FIG. 10B illustrates a subsequent state of the cache mask of the enhanced L2 cache directory entry of FIG. 10A modified to indicate the installation of the requested data line in an L1 cache of a requesting L1 processor core in accordance with one embodiment of the invention. In FIG. 10B, as the requested data line was installed in L1 cache 204[0], the L1 cache [0] value 1006B is set to one (1) indicating that the requested data line is now stored in the L1 cache.

Further, as the data line is now present in L1 cache 204[0], the L2 cache only value 1002B is now set to zero (0) indicating that the requested data line is not only present in shared L2 cache 220. As the data line was not evicted from the shared L2 cache, the L2 cache value 1004B remains set to one (1). As the data line is not present in L1 cache 204[1], the L1 cache [1] value 1008B remains set to zero (0). Thus, the L1 cache mask reflects the current state of the data line and no longer indicates a storage history of the data line in the L1 caches. Referring back again to FIG. 4D, from GENERATE CACHE MASK operation 458, processing transitions, at operation 460, to EXIT operation 426 (FIG. 4A) with processing exiting method 400.

The above examples describe embodiments of the invention in which an access request is a read access request. The following examples describe embodiments in accordance with the invention in which an access request is a write access request.

Referring now back again to FIG. 4A, and ACCESS REQUEST TYPE check operation 404, alternatively, rather than an access request being a read access request, if the access request is a write access request, processing transitions from ACCESS REQUEST TYPE check operation 404 to a LINE IN SHARED L2 CACHE check operation 406.

In LINE IN SHARED L2 CACHE check operation 406, in one embodiment, a determination is made whether or not the requested data line is found in the shared L2 cache, e.g., shared L2 cache 220. In particular, in one embodiment, a determination is made whether or not the requested data line is found in the shared L2 cache in an owned, modified, or exclusive MCP state. In one embodiment, shared L2 cache 220 is queried for the requested data line, for example, is queried for the tag identifying the requested data line, and the MCP state is determined from the associated MCP value, e.g., MCP value 302 (FIG. 3).

Figure 4E:
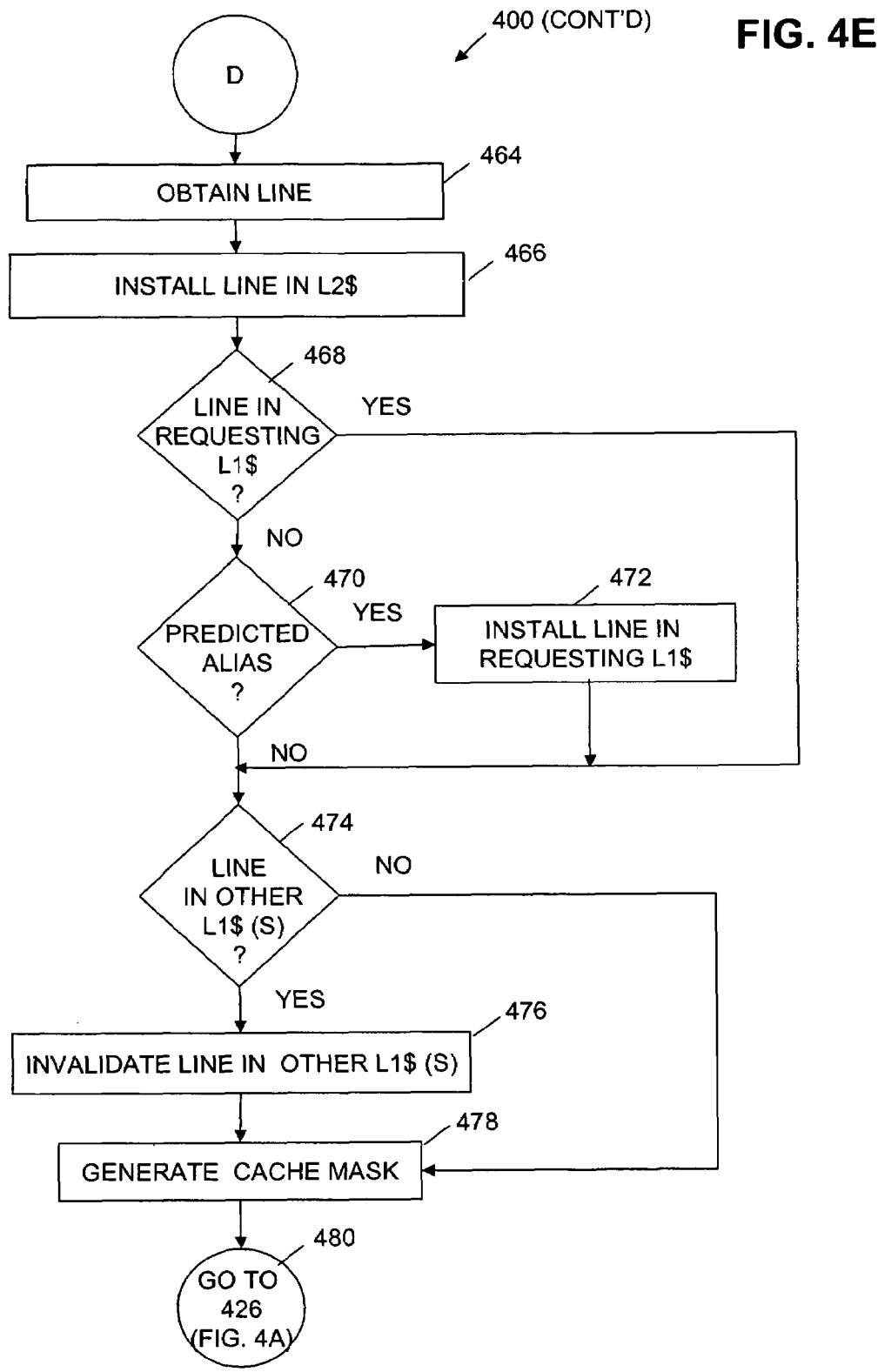

If the requested data line is not present in shared L2 cache 220 in an owned, modified, or exclusive MCP state ("NO"), from LINE IN SHARED L2 CACHE check operation 406, processing transitions, at operation 408, to an OBTAIN LINE operation 464 (FIG. 4E). Alternatively, if the requested data line is present in shared L2 cache 220 in an owned, modified, or exclusive MCP state ("YES"), processing transitions from LINE IN SHARED L2 CACHE check operation 406, at operation 410, to a LINE IN REQUESTING L1 CACHE check operation 482 (FIG. 4F) described further herein.

Referring now generally to FIG. 4E, in one embodiment, when a requesting processor core issues a write access request, and the requested data line is not present in the shared L2 cache in an owned, modified, or exclusive state, the requested data line is obtained from an off-chip memory structure. The requested data line is installed in the shared L2 cache in an owned or exclusive state. If the requested data line is not present in the L1 cache of the requesting processor core, the requested data line is also installed in the L1 cache of the requesting processor core if it is predicted that a subsequent load from the same processor core is likely to alias to the requested data line. Further, if the requested data line is present in any L1 caches of the other processor cores, the data line is invalidated in the L1 caches of the other processor cores.

Thus, in OBTAIN LINE operation 464, in one embodiment, the requested data line is obtained, for example off chip from an L3 cache, e.g., L3 cache 106, or from main memory, e.g., main memory 108. From OBTAIN LINE operation 464, processing transitions to an INSTALL LINE IN L2 CACHE operation 466.

In INSTALL LINE IN L2 CACHE operation 466, the requested data line obtained in operation 464, is installed in the shared L2 cache, e.g., shared L2 cache 220. From INSTALL LINE IN SHARED L2 CACHE operation 466, processing transitions to a LINE IN REQUESTING L1 CACHE check operation 468.

In LINE IN REQUESTING L1 CACHE check operation 468, a determination is made whether or not the requested data line obtained in operation 464 is present in the L1 cache of the requesting processor core, e.g., L1 cache 204[0]. If the requested data line is not present in the L1 cache ("NO"), processing transitions from LINE IN REQUESTING L1 CACHE check operation 468 to a PREDICTED ALIAS check operation 470. Otherwise, if the requested data line is present in the L1 cache ("YES"), from LINE IN REQUESTING L1 CACHE check operation 468, processing transitions to a LINE IN OTHER L1 CACHE(S) check operation 474, further described herein.

In PREDICTED ALIAS check operation 470, a determination is made whether or not a subsequent load from the same processor core, e.g., processor core 232[0], is likely to alias to the requested data line.

In one embodiment, any suitable prediction mechanism can be used to make this determination. If it is predicted that a subsequent load from the same processor core is likely to alias to the requested data line, from PREDICTED ALIAS check operation 470, processing transitions to an INSTALL LINE IN REQUESTING L1 CACHE operation 472.

In INSTALL LINE IN REQUESTING L1 CACHE operation 472, the line obtained in operation 464 is installed in the requesting L1 cache, e.g., L1 cache 204[0]. From INSTALL LINE IN REQUESTING L1 CACHE operation 472, processing transitions to a LINE IN OTHER L1 CACHE(S) check operation 474 further described herein.

Referring again to PREDICTED ALIAS check operation 470, alternatively, if it is predicted that a subsequent load from the same processor core is not likely to alias to the requested data line, from PREDICTED ALIAS check operation 470, processing transitions to a LINE IN OTHER L1 CACHE(S) check operation 474.

In LINE IN OTHER L1 CACHE(S) check operation 474, a determination is made whether or not the requested data line is present in any L1 cache(s) other than the requesting L1 cache. If the requested data line is present in one or more other L1 caches ("YES"), from LINE IN OTHER L1 CACHE(S) check operation 474, processing transitions to an INVALIDATE LINE IN OTHER L1 CACHE(S) operation 476. Otherwise, if the requested data line is not present in one or more other L1 caches ("NO"), from LINE IN OTHER L1 CACHE(S) check operation 474, processing transitions to a GENERATE CACHE MASK operation 478 further described herein.

In INVALIDATE LINE IN OTHER L1 CACHE(S) operation 476, the data line present in the other L1 cache(s) is invalidated, as the data line is now being modified by the requesting processor core. From INVALIDATE LINE IN OTHER L1 CACHE(S) operation 476, processing transitions to a GENERATE CACHE MASK operation 478.

In GENERATE CACHE MASK operation 478, in one embodiment, an enhanced L2 cache directory entry including a cache mask is generated in shared L2 cache 220 corresponding to the requested data line. If an earlier enhanced L2 cache directory entry, i.e., an initial state, is already present in shared L2 cache 220, in one embodiment, the initial state is updated, i.e., modified, to indicate the current positioning of the requested data line. Examples of an update of a cache mask of an enhanced L2 cache directory entry is further described herein with reference to FIGS. 12A and 12B, FIGS. 13A and 13B, and FIGS. 14A and 14B.

In the example illustrated in FIGS. 12A and 12B, a requested data line is not present in a shared L2 cache but is present in a requesting L1 cache as well as in an L1 cache of another processor core. The requested data line is installed in the shared L2 cache and invalidated in the other L1 cache.

In the example illustrated in FIGS. 13A and 13B, a requested data line is not present in a shared L2 cache, is not present in a requesting L1 cache, is predicted to be aliased to by the same processor core, and is present in another L1 cache. The requested data line is installed in the shared L2 cache, installed in the requesting L1 cache, and invalidated in the other L1 cache.

In the example illustrated in FIGS. 14A and 14B, a data line is not present in a shared L2 cache, is not present in a requesting L1 cache, and is not predicted to be aliased to by the same processor core, and is not present in another L1 cache. The requested data line is installed in the shared L2 cache, but not installed in the requesting L1 cache, as the requested data line is not predicted to be aliased to by the same processor core.

FIG. 12A illustrates one example of an initial state of a cache mask of an enhanced L2 cache directory entry associated with a requested data line that is not present in a shared L2 cache but is present in a requesting L1 cache as well as in an L1 cache of another processor core in accordance with one embodiment of the invention. In FIG. 12A, in one embodiment, as the requested data line is not present in the shared L2 cache, the L2 cache only value 1202A and the L2 cache value 1204A are each set to zero (0). As the data line is present in the requesting L1 cache, e.g., L1 cache 204[0], the L1 cache [0] value 1206A is set to one (1). As the data line is also present in another L1 cache, e.g., L1 cache 204[1], the L1 cache [1] value 1208A is set to one (1).

FIG. 12B illustrates one example of a subsequent state of the cache mask of the enhanced L2 cache directory entry of FIG. 12A modified to indicate the installation of a requested data line in a shared L2 cache and invalidation of the data line in L1 caches other than the requesting L1 cache in accordance with one embodiment of the invention. In FIG. 12B, as the data line was installed in the shared L2 cache, the L2 cache value 1204B is now set to one (1) indicating that the data line is now stored in the shared L2 cache, e.g., shared L2 cache 220. As the data line remains in the requesting L1 cache, e.g., L1 cache 204[0], the L1 cache [0] value 1206B remains set to one (1). Further, as the data line is invalidated in the other L1 cache, e.g., L1 cache 204[1], the L1 cache [1] value 1208B is now set to zero (0). The L2 cache only value 1202B remains set to zero (0) as the data line is present in the shared L2 cache and in the requesting L1 cache.

FIG. 13A illustrates one example of an initial state a cache mask of an enhanced L2 cache directory entry associated with a requested data line that is not present in a shared L2 cache, is not present in a requesting L1 cache, but is present in an L1 cache of another processor core in accordance with one embodiment of the invention. In FIG. 13A, in one embodiment, as the requested data line is not present in the shared L2 cache, the L2 cache only value 1302A and the L2 cache value 1304A are each set to zero(0). As the data line is not present in the requesting L1 cache, e.g., L1 cache 204[0], the L1 cache [0] value 1306A is set to zero (0). As the data line is present in an L1 cache of another processor core, e.g., L1 cache 204[1], the L1 cache [1] value 1308A is set to one (1).

FIG. 13B illustrates one example of a subsequent state of the cache mask of the enhanced L2 cache directory entry of FIG. 13A modified to indicate the installation of a requested data line in a shared L2 cache, installation of the requested data line in a requesting L1 cache, and invalidation of the data line in L1 caches other than the requesting L1 cache in accordance with one embodiment of the invention. In FIG. 13B, as the data line was installed in the shared L2 cache, e.g., shared L2 cache 220, the L2 cache value 1304B is now set to one (1) indicating that the data line is now stored in the shared L2 cache.

In one embodiment, as the data line is likely to be aliased to by the same processor core, e.g., processor core 232[0], the data line is installed in the L1 cache of the requesting processor core, e.g., in L1 cache 204[0], thus the requesting L1 cache [0] value 1306B is now set to one (1). Further, as the data line is invalidated in the other L1 cache, e.g., L1 cache 204[1], the L1 cache [1] value 1308B is now set to zero (0). The L2 cache only value 1302B remains set to zero (0) as the data line is present in the shared L2 cache and in the requesting L1 cache.

FIG. 14A illustrates one example of an initial state of a cache mask of an enhanced L2 cache directory entry associated with a data line that is not present in a shared L2 cache, is not present in a requesting L1 cache, and is not present in another L1 cache in accordance with one embodiment of the invention. In FIG. 14A, in one embodiment, as the requested data line is not present in the shared L2 cache, e.g., shared L2 cache 220, the L2 cache only value 1402A and the L2 cache value 1404A are each set to zero (0). As the data line is not present in the requesting L1 cache, e.g., L1 cache 204[0], the L1 cache [0] value 1406A is set to zero (0). As the data line is not present in another L1 cache, e.g., L1 cache 204[1], the L1 cache [1] value 1408A is set to zero (0).

FIG. 14B illustrates one example of a subsequent state of the cache mask of the enhanced L2 cache directory entry of FIG. 14A modified to indicate the installation of a requested data line in a shared L2 cache in accordance with one embodiment of the invention. In FIG. 14B, as the data line is now installed in the shared L2 cache, e.g., shared L2 cache 220, the L2 cache value 1404B is set to one (1).

In one embodiment, as the data line is not predicted to be aliased to by the same processor core, e.g., processor core 232[0], the data line is not installed in the requesting L1 cache, e.g., L1 cache 204[0], thus the L1 cache [0] value 1406B remains set to zero (0). Further, the L1 cache [1] value 1408B remains set to zero (0). The L2 cache only value 1402B is now set to one (1) as the data line is present in the shared L2 cache only. Referring again to FIG. 4E, from GENERATE CACHE MASK operation 478, processing transitions, at operation 480, to EXIT operation 426 (FIG. 4A) with processing exiting method 400.

Figure 4F:
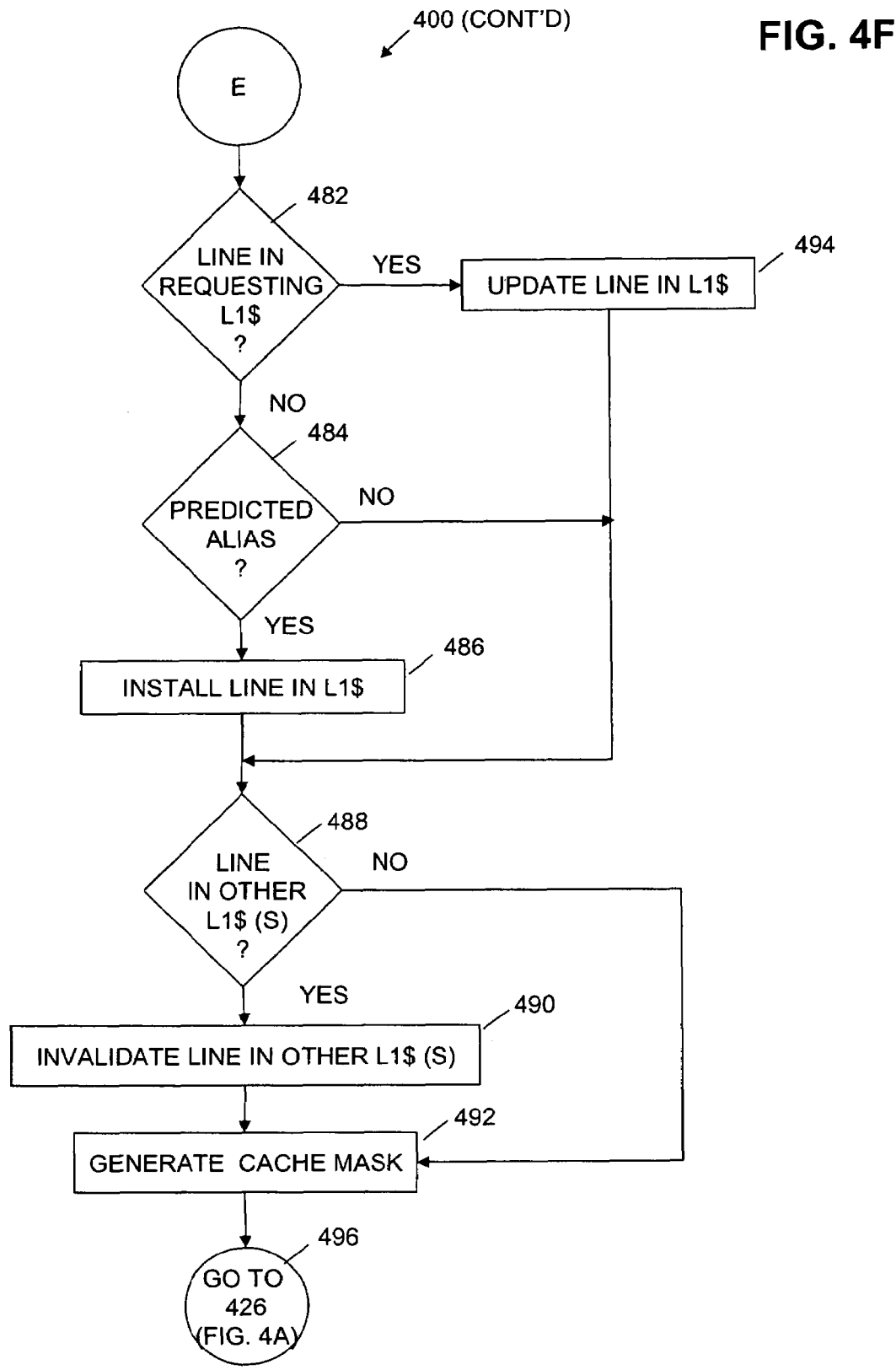

Referring now again to FIG. 4A, and LINE IN SHARED L2 CACHE check operation 406, rather than the requested data line not being present in the shared L2 cache in an owned, modified, or exclusive MCP state, alternatively, if it is determined the requested data line is present in the shared L2 cache in an owned, modified, or exclusive MCP state ("YES"), processing transitions from LINE IN SHARED L2 CACHE check operation 406, at operation 410, to a LINE IN REQUESTING L1 CACHE check operation 482 (FIG. 4F).

Referring now generally to FIG. 4F, when a requesting processor core issues a write access request, and the requested data line is not present in the L1 cache of the requesting processor core, and the requested data line is present in the shared L2 cache in an owned, modified, or exclusive state, the requested data line is installed in the L1 cache of the requesting processor core if it is predicted that a subsequent load from the same processor core is likely to alias to the requested data line. Further, if the data line is present in any L1 cache of the other processor cores, the data line is invalidated in the L1 caches of the other processor cores.

Thus, in LINE IN REQUESTING L1 CACHE check operation 482, a determination is made whether or not the requested data line is present in the L1 cache of the requesting processor core, e.g., L1 cache 204[0]. If the data line is not present in the L1 cache ("NO"), processing transitions from LINE IN REQUESTING L1 CACHE check operation 482 to a PREDICTED ALIAS check operation 484. Otherwise, if the data line is present in the L1 cache ("YES"), from LINE IN REQUESTING L1 CACHE check operation 482, processing transitions to an UPDATE LINE IN L1$ operation 494.

In UPDATE LINE IN L1$ operation 494, the data line is updated in the L1 cache. From UPDATE LINE IN L1 operation 494, processing transitions to a LINE IN OTHER L1 CACHE(S) check operation 488, further described herein.

In PREDICTED ALIAS check operation 484, a determination is made whether or not a subsequent load from the same processor core is likely to alias to the requested data line. In one embodiment, any suitable prediction mechanism can be used. If it is predicted that a subsequent load from the same processor core, e.g., processor core 232[0], is likely to alias to the requested data line, from PREDICTED ALIAS check operation 484, processing transitions to an INSTALL LINE IN REQUESTING L1 CACHE operation 486. Otherwise, if it is predicted that a subsequent load from the same processor core is not likely to alias to the requested data line, from PREDICTED ALIAS check operation 484, processing transitions to a LINE IN OTHER L1 CACHE(S) check operation 488 further described herein.

In INSTALL LINE IN REQUESTING L1 CACHE operation 486, the data line is installed in the requesting L1 cache, e.g., L1 cache 204[0]. From INSTALL LINE IN REQUESTING L1 CACHE operation 486, processing transitions to LINE IN OTHER L1 CACHE(S) check operation 488.

In LINE IN OTHER L1 CACHE(S) check operation 488, a determination is made whether or not the requested data line is present in an L1 cache of another processor core. If the requested data line is present in an L1 cache of another processor core ("YES"), from LINE IN OTHER L1 CACHE(S) check operation 488, processing transitions to an INVALIDATE LINE IN OTHER L1 CACHE(S) operation 490. Otherwise, if the requested data line is not present in an L1 cache of another processor core ("NO"), from LINE IN OTHER L1 CACHE(S) check operation 488, processing transitions to a GENERATE CACHE MASK operation 492 further described herein.

In INVALIDATE LINE IN OTHER L1 CACHE(S) operation 490, the data line present in an L1 cache of another processor core(s) is invalidated as the data line is now being modified by the requesting processor core. From INVALIDATE LINE IN OTHER L1 CACHE(S) operation 490, processing transitions to a GENERATE CACHE MASK operation 492.

In GENERATE CACHE MASK operation 492, in one embodiment, an enhanced L2 cache directory entry including a cache mask is generated in shared L2 cache 220 corresponding to the requested data line. If an earlier enhanced L2 cache directory entry, i.e., an initial state, is already present in shared L2 cache 220, in one embodiment, the initial state is updated, i.e., modified, to indicate the current positioning of the requested data line. Examples of an update of a cache mask of an enhanced L2 cache directory entry is further described herein with reference to FIGS. 15A and 15B, FIGS. 16A and 16B, and FIGS. 17A and 17B.

In the example illustrated in FIGS. 15A and 15B, a data line is present in a shared L2 cache, is not present in a requesting L1 cache, but is predicted to be aliased to by the same processor core, and is not present in an L1 cache of another processor core. The data line is installed in the requesting L1 cache.

In the example illustrated in FIGS. 16A and 16B, a data line is present in a shared L2 cache, is not present in a requesting L1 cache, and is not predicted to be aliased to by the same processor core, and is present in an L1 cache of another processor core. The data line is invalidated in the L1 cache of the other processor core.

In the example illustrated in FIGS. 17A and 17B, a data line is present in a shared L2 cache, is present in a requesting L1 cache, and is present in an L1 cache of another processor core. The data line is invalidated in the L1 cache of the other processor core.

FIG. 15A illustrates one example of an initial state of a cache mask of an enhanced L2 cache directory entry associated with a data line that is present in a shared L2 cache, but is not present in a requesting L1 cache or in an L1 cache of another processor core. In FIG. 15A, in one embodiment, as the requested data line is present in the shared L2 cache, e.g., shared L2 cache 220, the L2 cache value 1504A is set to one (1). As the data line is not present in the requesting L1 cache, e.g., L1 cache 204[0], the L1 cache [0] value 1506A is set to zero (0). As the data line is not present in an L1 cache of another processor core, the other L1 cache value(s), e.g., the L1 cache [1] value 1508A, is set to zero (0). As the data line is only present in the shared L2 cache, e.g., shared L2 cache 220, the L2 cache only value 1502A is set to one (1).

FIG. 15B illustrates one example of a subsequent state of the cache mask of the enhanced L2 cache directory entry of FIG. 15A modified to indicate the installation of a requested data line in the requesting L1 cache in accordance with one embodiment of the invention. In FIG. 15B, the L2 cache value 1504B remains set to one (1). As the data line is now installed in the requesting L1 cache, e.g., L1 cache 204[0], the L1 cache [0] value 1506B is now set to one (1). As the data line is now present in the shared L2 cache, e.g., shared L2 cache 220, and in the requesting L1 cache, e.g., L1 cache 204[0], the L2 cache only value 1502B is now set to one (1). The other L1 cache value(s), e.g., the L1 cache [1] value 1508B, remains set to zero (0).

FIG. 16A illustrates an example of an initial state of a cache mask of an enhanced L2 cache directory entry associated with a data line that is present in a shared L2 cache, is not present in a requesting L1 cache, and is not predicted to be aliased to by the same processor core, and is present in an L1 cache of another processor core in accordance with one embodiment of the invention. In FIG. 16A, in one embodiment, as the requested data line is present in the shared L2 cache, the L2 cache value 1604A is set to one (1). As the data line is not present in the requesting L1 cache, e.g., L1 cache 204[0], the L1 cache [0] value 1606A is set to zero (0). As the data line is present in an L1 cache of another processor core, e.g., L1 cache 204[1], the other L1 cache values(s), e.g., the L1 cache [1] value 1608A, is set to one (1). As the data line is present in the shared L2 cache and in an L1 cache, e.g., L1 cache 204[1], the L2 cache only value 1602A is set to zero (0).

FIG. 16B illustrates one example of a subsequent state of the cache mask of the enhanced L2 cache directory entry of FIG. 16A modified to indicate the invalidation of the data line in L1 caches other than the requesting L1 cache in accordance with one embodiment of the invention. In FIG. 16B, in one embodiment, as the data line is not predicted to be aliased to by the same processor core, e.g., processor core 232[0], the data line is not installed in the requesting L1 cache, thus the L1 cache [0] value 1606B remains set to zero (0). Further, as the data line is invalidated in the other L1 cache, e.g., L1 cache 204[1], the L1 cache [1] value 1608B is now set to zero (0). The L2 cache value 1604B remains set to zero (0). The L2 cache only value 1602B is now set to one (1) as the data line is now present only in the shared L2 cache.

FIG. 17A illustrates one example of an initial state of a cache mask of an enhanced L2 cache directory entry associated with a data line that is present in a shared L2 cache, is present in a requesting L1 cache, and is present in an L1 cache of another processor core in accordance with one embodiment of the invention. In FIG. 17A, in one embodiment, as the requested data line is present in the shared L2 cache and in an L1 cache, the L2 cache value 1702A is set to one (1), and the L2 cache only value is set to zero (0). As the data line is present in the requesting L1 cache, e.g., L1 cache 204[0], the L1 cache [0] value 1706A is set to one (1). As the data line is present in an L1 cache of another processor core, e.g., the L1 cache 204[1], the other L1 cache value(s), e.g., the L1 cache [1] value 1708A, is set to one (1).

FIG. 17B illustrates one example of a subsequent state of the cache mask of the enhanced L2 cache directory entry of FIG. 17A modified to indicate the invalidation of a data line in an L1 cache of another processor core in accordance with one embodiment of the invention. In FIG. 17B, as the data line was already present in the shared L2 cache, e.g., shared L2 cache 220, and the requesting L1 cache, e.g., L1 cache 204[0], the L2 cache value 1704B remains set to one (1) and the requesting L1 cache value, e.g., the L1 cache [0] value 1706B, remains set to one (1). Further the L2 cache only value 1702B remains set to zero (0) as the data line is present in the shared L2 cache and in an L1 cache, e.g., L1 cache 204[0]. As the data line in the L1 cache of the other processor core, e.g., L1 cache 204[1], is invalidated, the L1 cache [1] value 1708B is now set to zero (0). Referring again to FIG. 4F, from GENERATE CACHE MASK operation 492, processing transitions, at operation 494, to EXIT operation 426 (FIG. 4A) with processing exiting method 400.

In some embodiments, when a data line is invalidated in an L1 cache or evicted from it in accordance with method 400, if the data line is used prior to invalidation or eviction, and if the data line is not already present in the shared L2 cache, the data line is installed into the shared L2 cache. Alternatively, if the data line is not used prior to invalidation or eviction, the data line is not installed into the shared L2 cache. In this way prefetches that were not used, i.e., useless prefetches, do not pollute the shared L2 cache.

In one embodiment, to record the usage information of a data line stored in an L1 cache, an additional value, herein termed an L1 cache use value, is included in the L1 cache directory entry for each associated L1 cache. For example, in one embodiment, enhanced L2 cache directory entry 234 (FIG. 2) further includes an L1 cache use value (not shown) associated with each L1 cache 204[0]-204[N] that indicates if an associated data line is actually accessed in the L1 cache by a processor core.

For example, in one embodiment, an L1 cache use value is initialized to zero (0) when a data line is first installed in the associated L1 cache. When the data line is actually accessed by a processor core, the L1 cache use value is set to one (1). At the time of invalidation or eviction of the data line from the associated L1 cache, if the cache use value is zero (0), which indicates that the line has not been used, the line is not installed into the shared L2 cache. If the cache use value is one (1), which indicates that the line has been used, the line is installed into the shared L2 cache, if it is not already present in the shared L2 cache.

Embodiments in accordance with the invention facilitate efficient data communication and data sharing among the processor cores of a CMP via the shared L2 cache and concurrently reduce the competition among the processor cores for space in the shared L2 cache for storage of private data. Further in some embodiments, as a data line brought in by a processor core's prefetch request is not stored in the shared L2 cache unless used by the requesting processor core, useless prefetches do not pollute the shared L2 cache.

This disclosure provides exemplary embodiments of the present invention. The scope of the present invention is not limited by these exemplary embodiments. Numerous variations, whether explicitly provided for by the specification or implied by the specification or not can be implemented by one of skill in the art in view of this disclosure.

We claim:

1. A computer implemented method for storing a data line in one or more caches of a chip multiprocessor, said chip multiprocessor including a plurality of processor cores, each of said plurality of processor cores including at least one first level (L1) cache, each of said plurality of processor cores communicatively coupled to a shared second level (L2) cache, said computer implemented method comprising:

receiving an access request from a requesting processor core of said chip multiprocessor, said access request identifying said data line;

storing said data line in at least one of said shared second level (L2) cache and said at least one first level (L1) cache based on a sharing of said data line in said chip multiprocessor;

generating an enhanced second level (L2) cache directory
entry in a shared second level (L2) cache directory of
said shared second level (L2) cache, said enhanced second level (L2) cache directory entry indicating a storage
state of said data line in said chip multiprocessor;
determining whether said access request is a read access
request or a write access request;
when said access request is a read access request, determining whether said data line is in said first level (L1)
cache;
when said data line is not in said first level (L1) cache,
determining whether said data line is in said shared
second level (L2) cache;
when said data line is in said shared second level (L2)
cache, obtaining said data line from said shared second
level (L2) cache;
installing said data line in said first level (L1) cache of said
requesting processor core;
determining whether said data line is in said shared second
level (L2) cache only;
when said data line is in said shared second level (L2) cache
only, determining whether said data line was previously
stored in said first level (L1) cache of said requesting
processor core only;
when said data line was previously stored in said first level
(L1) cache of said requesting processor core only, evicting said data line from said shared second level (L2)
cache; and
generating an enhanced second level (L2) cache directory
entry including a cache mask, said cache mask indicating a storage state of said data line in said chip multiprocessor.

2. A computer implemented method for storing a data line
in one or more caches of a chip multiprocessor, said chip
multiprocessor including a plurality of processor cores, each
of said plurality of processor cores including at least one first
level (L1) cache, each of said plurality of processor cores
communicatively coupled to a shared second level (L2)
cache, said computer implemented method comprising:
receiving an access request from a requesting processor
core of said chip multiprocessor, said access request
identifying said data line;
storing said data line in at least one of said shared second
level (L2) cache and said at least one first level (L1)
cache based on a sharing of said data line in said chip
multiprocessor;
generating an enhanced second level (L2) cache directory
entry in a shared second level (L2) cache directory of
said shared second level (L2) cache, said enhanced second level (L2) cache directory entry indicating a storage
state of said data line in said chip multiprocessor;
determining whether said access request is a read access
request or a write access request;
when said access request is a read access request, determining whether said data line is in said first level (L1)
cache;
when said data line is not in said first level (L1) cache,
determining whether said data line is in said shared
second level (L2) cache;
when said data line is in said shared second level (L2)
cache, obtaining said data line from said shared second
level (L2) cache;
installing said data line in said first level (L1) cache of said
requesting processor core;
determining whether said data line is in said shared second
level (L2) cache only;
when said data line is in said shared second level (L2) cache
only, determining whether said data line was previously
stored in said first level (L1) cache of said requesting
processor core only;
when said data line was not previously stored in said first
level (L1) cache of said requesting processor core only,
determining whether said data line was previously
stored in a first level (L1) cache of another processor
core;
when said data line was not previously stored in a first level
(L1) cache of another processor core, evicting said data
line from said shared second level (L2) cache; and
generating an enhanced second level (L2) cache directory
entry including a cache mask, said cache mask indicating a storage state of said data line in said chip multiprocessor.

3. A computer implemented method for storing a data line
in one or more caches of a chip multiprocessor, said chip
multiprocessor including a plurality of processor cores, each
of said plurality of processor cores including at least one first
level (L1) cache, each of said plurality of processor cores
communicatively coupled to a shared second level (L2)
cache, said computer implemented method comprising:
receiving an access request from a requesting processor
core of said chip multiprocessor, said access request
identifying said data line;
storing said data line in at least one of said shared second
level (L2) cache and said at least one first level (L1)
cache based on a sharing of said data line in said chip
multiprocessor;
generating an enhanced second level (L2) cache directory
entry in a shared second level (L2) cache directory of
said shared second level (L2) cache, said enhanced second level (L2) cache directory entry indicating a storage
state of said data line in said chip multiprocessor;
determining whether said access request is a read access
request or a write access request;
when said access request is a read access request, determining whether said data line is in said first level (L1)
cache;
when said data line is not in said first level (L1) cache,
determining whether said data line is in said shared
second level (L2) cache;
when said data line is in said shared second level (L2)
cache, obtaining said data line from said shared second
level (L2) cache;
installing said data line in said first level (L1) cache of said
requesting processor core;
determining whether said data line is in said shared second
level (L2) cache only;
when said data line is in said shared second level (L2) cache
only, determining whether said data line was previously
stored in said first level (L1) cache of said requesting
processor core only;
when said data line was not previously stored in said first
level (L1) cache of said requesting processor core only,
determining whether said data line was previously
stored in a first level (L1) cache of another processor
core; and
when said data line was previously stored in a first level
(L1) cache of another processor core, generating an
enhanced second level (L2) cache directory entry
including a cache mask, said cache mask indicating a
storage state of said data line in said chip multiprocessor.

4. A computer implemented method for storing a data line
in one or more caches of a chip multiprocessor, said chip
multiprocessor including a plurality of processor cores, each of said plurality of processor cores including at least one first level (L1) cache, each of said plurality of processor cores communicatively coupled to a shared second level (L2) cache, said computer implemented method comprising:
- receiving an access request from a requesting processor core of said chip multiprocessor, said access request identifying said data line;
- storing said data line in at least one of said shared second level (L2) cache and said at least one first level (L1) cache based on a sharing of said data line in said chip multiprocessor;
- generating an enhanced second level (L2) cache directory entry in a shared second level (L2) cache directory of said shared second level (L2) cache, said enhanced second level (L2) cache directory entry indicating a storage state of said data line in said chip multiprocessor;
- determining whether said access request is a read access request or a write access request;
- when said access request is a write access request, determining whether said data line is in said shared second level (L2) cache;
- when said data line is not in said shared second level (L2) cache, obtaining said data line;
- installing said data line in said shared second level (L2) cache;
- determining whether said data line is in said first level (L1) cache of said requesting processor core;
- when said data line is not in said first level (L1) cache of said requesting processor core, determining whether said data line is predicted to be aliased to by said requesting processor core;
- when said data line is predicted to be aliased to by said requesting processor core, installing said data line in said first level (L1) cache of said requesting processor core;
- determining whether said data line is in a first level (L1) cache of another processor core;
- when said data line is in said first level (L1) cache of another processor core, invalidating said data line in said first level (L1) cache of said other processor core;
- determining whether said data line in said first level (L1) cache of said other processor core was previously used by said other processor core, and when said data line in said first level (L1) cache of said other processor core was previously used by said other processor core, installing said data line in said shared second level (L2) cache; and
- generating an enhanced second level (L2) cache directory entry including a cache mask, said cache mask indicating a storage state of said data line in said chip multiprocessor.

5. A computer implemented method for storing a data line in one or more caches of a chip multiprocessor, said chip multiprocessor including a plurality of processor cores, each of said plurality of processor cores including at least one first level (L1) cache, each of said plurality of processor cores communicatively coupled to a shared second level (L2) cache, said computer implemented method comprising:
- receiving an access request from a requesting processor core of said chip multiprocessor, said access request identifying said data line;
- storing said data line in at least one of said shared second level (L2) cache and said at least one first level (L1) cache based on a sharing of said data line in said chip multiprocessor;
- generating an enhanced second level (L2) cache directory entry in a shared second level (L2) cache directory of said shared second level (L2) cache, said enhanced second level (L2) cache directory entry indicating a storage state of said data line in said chip multiprocessor;
- determining whether said access request is a read access request or a write access request;
- when said access request is a write access request, determining whether said data line is in said shared second level (L2) cache;
- when said data line is not in said shared second level (L2) cache, obtaining said data line;
- installing said data line in said shared second level (L2) cache;
- determining whether said data line is in said first level (L1) cache of said requesting processor core;
- when said data line is not in said first level (L1) cache of said requesting processor core, determining whether said data line is predicted to be aliased to by said requesting processor core;
- when said data line is not predicted to be aliased to by said requesting processor core, determining whether said data line is in a first level (L1) cache of another processor core; and
- when said data line is not in said first level (L1) cache of another processor core, generating an enhanced second level (L2) cache directory entry including a cache mask, said cache mask indicating a storage state of said data line in said chip multiprocessor.

6. A computer implemented method for storing a data line in one or more caches of a chip multiprocessor, said chip multiprocessor including a plurality of processor cores, each of said plurality of processor cores including at least one first level (L1) cache, each of said plurality of processor cores communicatively coupled to a shared second level (L2) cache, said computer implemented method comprising:
- receiving an access request from a requesting processor core of said chip multiprocessor, said access request identifying said data line;
- storing said data line in at least one of said shared second level (L2) cache and said at least one first level (L1) cache based on a sharing of said data line in said chip multiprocessor;
- generating an enhanced second level (L2) cache directory entry in a shared second level (L2) cache directory of said shared second level (L2) cache, said enhanced second level (L2) cache directory entry indicating a storage state of said data line in said chip multiprocessor;
- determining whether said access request is a read access request or a write access request;
- when said access request is a write access request, determining whether said data line is in said shared second level (L2) cache;
- when data line is in said shared second level (L2) cache, determining whether said data line is in said first level (L1) cache of said requesting processor core;
- when said data line is not in said first level (L1) cache of said requesting processor core, determining whether said data line is predicted to be aliased to by said requesting processor core;
- when said data line is predicted to be aliased to by said requesting processor core, installing said data line in said first level (L1) cache of said requesting processor core;
- determining whether said data line is in a first level (L1) cache of another processor core; and
- when said data line is not in said first level (L1) cache of another processor core, generating an enhanced second level (L2) cache directory entry including a cache mask, said cache mask indicating a storage state of said data line in said chip multiprocessor.

7. A computer implemented method for storing a data line in one or more caches of a chip multiprocessor, said chip multiprocessor including a plurality of processor cores, each of said plurality of processor cores including at least one first level (L1) cache, each of said plurality of processor cores communicatively coupled to a shared second level (L2) cache, said computer implemented method comprising:

receiving an access request from a requesting processor core of said chip multiprocessor, said access request identifying said data line;

storing said data line in at least one of said shared second level (L2) cache and said at least one first level (L1) cache based on a sharing of said data line in said chip multiprocessor;

generating an enhanced second level (L2) cache directory entry in a shared second level (L2) cache directory of said shared second level (L2) cache, said enhanced second level (L2) cache directory entry indicating a storage state of said data line in said chip multiprocessor;

determining whether said access request is a read access request or a write access request;

when said access request is a write access request, determining whether said data line is in said shared second level (L2) cache;

when data line is in said shared second level (L2) cache, determining whether said data line is in said first level (L1) cache of said requesting processor core;

when said data line is not in said first level (L1) cache of said requesting processor core, determining whether said data line is predicted to be aliased to by said requesting processor core;

when said data line is predicted to be aliased to by said requesting processor core, installing said data line in said first level (L1) cache of said requesting processor core;

determining whether said data line is in a first level (L1) cache of another processor core;

when said data line is in said first level (L1) cache of another processor core, invalidating said data line in said first level (L1) cache of said other processor core;

determining whether said data line in said first level (L1) cache of said other processor core was previously used by said other processor core, and when said data line in said first level (L1) cache of said other processor core was previously used by said other processor core, installing said data line in said shared second level (L2) cache; and generating an enhanced second level (L2) cache directory entry including a cache mask, said cache mask indicating a storage state of said data line in said chip multiprocessor.

* * * * *